(12) United States Patent
Hanif et al.

(10) Patent No.: US 12,477,360 B2
(45) Date of Patent: Nov. 18, 2025

(54) TECHNIQUES FOR PRIMARY SIDELINK CARRIER UPDATING IN SIDELINK CARRIER AGGREGATION

(71) Applicant: QUALCOMM Incorporated, San Diego, CA (US)

(72) Inventors: Ahmed Farhan Hanif, Versailles (FR); Jelena Damnjanovic, Del Mar, CA (US); Sony Akkarakaran, Poway, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 449 days.

(21) Appl. No.: 18/057,608

(22) Filed: Nov. 21, 2022

(65) Prior Publication Data

US 2024/0172004 A1    May 23, 2024

(51) Int. Cl.
*H04W 74/04*    (2009.01)
*H04B 7/06*    (2006.01)
(Continued)

(52) U.S. Cl.
CPC ........ *H04W 24/04* (2013.01); *H04B 7/06964* (2023.05); *H04L 41/0668* (2013.01);
(Continued)

(58) Field of Classification Search
CPC ..... H04W 24/04; H04W 24/08; H04W 92/18; H04W 72/20; H04B 7/06964;
(Continued)

(56) References Cited

U.S. PATENT DOCUMENTS

2020/0252989 A1    8/2020 Chen et al.
2022/0039191 A1    2/2022 Raghavan et al.
(Continued)

FOREIGN PATENT DOCUMENTS

WO    WO-2024015558 A1 *    1/2024    ............ H04B 7/088

OTHER PUBLICATIONS

Partial International Search Report—PCT/US2023/079659—ISA/EPO—Mar. 14, 2024 (2300347WO).
(Continued)

*Primary Examiner* — Vinncelas Louis
(74) *Attorney, Agent, or Firm* — Holland & Hart LLP

(57) ABSTRACT

Methods, systems, and devices for wireless communications are described. A user equipment (UE) may transmit a first set of reference signals via a primary sidelink carrier of a sidelink carrier aggregation configuration and a second set of reference signals via one or more secondary sidelink carriers of the sidelink carrier aggregation configuration. The UE may receive, based on the reference signals, a measurement message indicating measurements for a set of beams corresponding to a secondary sidelink carrier of the sidelink carrier aggregation configuration based on a beam failure instance for the primary sidelink carrier. The UE may transmit, via Layer 1 signaling or Layer 2 signaling, a control message indicating to switch the primary sidelink carrier to the set of beams based on the measurements for the set of beams and the beam failure instance for the primary sidelink carrier.

21 Claims, 16 Drawing Sheets

(51) Int. Cl.
*H04L 41/0668* (2022.01)
*H04W 24/04* (2009.01)
*H04W 24/08* (2009.01)
*H04B 17/318* (2015.01)
*H04W 92/18* (2009.01)

(52) U.S. Cl.
CPC ........... *H04W 24/08* (2013.01); *H04B 17/318* (2015.01); *H04W 92/18* (2013.01)

(58) Field of Classification Search
CPC ....... H04B 17/318; H04B 7/088; H04L 5/001; H04L 41/0668
See application file for complete search history.

(56) References Cited

U.S. PATENT DOCUMENTS

2024/0422760 A1* 12/2024 Wu .................... H04B 7/06964
2025/0031229 A1* 1/2025 Leng .................... H04W 72/20

OTHER PUBLICATIONS

International Search Report and Written Opinion—PCT/US2023/079659—ISA/EPO—May 7, 2024 (2300347WO).

* cited by examiner

TECHNIQUES FOR PRIMARY SIDELINK CARRIER UPDATING IN SIDELINK CARRIER AGGREGATION

FIELD OF TECHNOLOGY

The following relates to wireless communications, including techniques for primary sidelink carrier updating in sidelink carrier aggregation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for primary sidelink carrier updating in sidelink carrier aggregation. For example, the described techniques provide for a user equipment (UE) perform independent beam management procedures per sidelink component carrier in a sidelink carrier aggregation configuration. If a primary sidelink carrier experiences beam failure, but one of the secondary sidelink carriers is available, the UE may switch the primary sidelink carrier to one of the available secondary carriers. For example, in cases where another secondary sidelink carrier is available, the transmitting UE may perform a primary sidelink carrier beam change, switch, or reselection by conveying assistance information to the receiving UE via a secondary sidelink carrier.

The UE may perform the primary sidelink carrier switch at different times with respect to beam failure detection (BFD) and beam failure recovery (BFR) procedures. In some cases, the transmitting UE may start BFR and may attempt a random access procedure to recover the primary sidelink carrier. In cases where the random access procedure is unsuccessful, but one of the secondary sidelink carriers is available, the UE may attempt to change the primary sidelink carrier to one of the available secondary sidelink carriers. In some examples, the transmitting UE may change the primary sidelink carrier prior to detecting beam failure and performing BFD procedures. For example, if the UE determines that a secondary sidelink carrier is of a higher quality than the primary sidelink carrier prior to detecting beam failure and performing BFR, the UE may change the primary sidelink carrier to the secondary sidelink carrier. In some other example, the transmitting UE may change the primary sidelink carrier prior to performing the random access procedure during BFR. In some examples described herein, the transmitting UE and the receiving UE may initiate timers for BFR, where the transmitting UE and receiving UE switch between stages of BFR and BFD based on the timers. For example, the transmitting UE or the receiving UE, or both, may start a first timer during BFR when performing a beam reselection for the primary sidelink carrier. If the first timer expires, the UEs may move to a next stage of a BFR procedure and start a second timer for performing a random access procedure for the primary sidelink carrier prior to declaring RLF.

A method for wireless communications at a first UE is described. The method may include transmitting a first set of reference signals via a primary sidelink carrier of a sidelink carrier aggregation configuration and a second set of reference signals via one or more secondary sidelink carriers of the sidelink carrier aggregation configuration, receiving, based on the first set of reference signals and the second set of reference signals, a measurement message indicating measurements for a set of beams corresponding to a secondary sidelink carrier of the sidelink carrier aggregation configuration based on a beam failure instance for the primary sidelink carrier, and transmitting, via Layer 1 signaling or Layer 2 signaling, a control message indicating to switch the primary sidelink carrier to the set of beams based on the measurements for the set of beams and the beam failure instance for the primary sidelink carrier.

An apparatus for wireless communications at a first UE is described. The apparatus may include a processor and a memory coupled with the processor. The memory may include instructions which are executable by the processor to cause the apparatus to transmit a first set of reference signals via a primary sidelink carrier of a sidelink carrier aggregation configuration and a second set of reference signals via one or more secondary sidelink carriers of the sidelink carrier aggregation configuration, receive, based on the first set of reference signals and the second set of reference signals, a measurement message indicating measurements for a set of beams corresponding to a secondary sidelink carrier of the sidelink carrier aggregation configuration based on a beam failure instance for the primary sidelink carrier, and transmit, via Layer 1 signaling or Layer 2 signaling, a control message indicating to switch the primary sidelink carrier to the set of beams based on the measurements for the set of beams and the beam failure instance for the primary sidelink carrier.

Another apparatus for wireless communications at a first UE is described. The apparatus may include means for transmitting a first set of reference signals via a primary sidelink carrier of a sidelink carrier aggregation configuration and a second set of reference signals via one or more secondary sidelink carriers of the sidelink carrier aggregation configuration, means for receiving, based on the first set of reference signals and the second set of reference signals, a measurement message indicating measurements for a set of beams corresponding to a secondary sidelink carrier of the sidelink carrier aggregation configuration based on a beam failure instance for the primary sidelink carrier, and means for transmitting, via Layer 1 signaling or Layer 2 signaling, a control message indicating to switch the primary sidelink carrier to the set of beams based on the measurements for the set of beams and the beam failure instance for the primary sidelink carrier.

A non-transitory computer-readable medium storing code for wireless communications at a first UE is described. The code may include instructions executable by a processor to transmit a first set of reference signals via a primary sidelink carrier of a sidelink carrier aggregation configuration and a second set of reference signals via one or more secondary sidelink carriers of the sidelink carrier aggregation configuration, receive, based on the first set of reference signals and the second set of reference signals, a measurement message indicating measurements for a set of beams corresponding to a secondary sidelink carrier of the sidelink carrier aggregation configuration based on a beam failure instance for the primary sidelink carrier, and transmit, via Layer 1 signaling or Layer 2 signaling, a control message indicating to switch the primary sidelink carrier to the set of beams based on the measurements for the set of beams and the beam failure instance for the primary sidelink carrier.

Some examples of the method, apparatuses, and non-transitory computer-readable medium described herein may further include operations, features, means, or instructions for transmitting sidelink control information via the set of beams based on switching the primary sidelink carrier to the set of beams.

Some examples of the method, apparatuses, and non-transitory computer-readable medium described herein may further include operations, features, means, or instructions for switching the primary sidelink carrier to the set of beams corresponding to the secondary sidelink carrier based on the set of beams corresponding to the secondary sidelink carrier sustaining a radio resource control link of the primary sidelink carrier.

Some examples of the method, apparatuses, and non-transitory computer-readable medium described herein may further include operations, features, means, or instructions for determining the measurements for the set of beams corresponding to the secondary sidelink carrier satisfy a threshold associated with sustaining a radio resource control link of the primary sidelink carrier, where transmitting the control message may be based on the measurements for the set of beams satisfying the threshold.

In some examples of the method, apparatuses, and non-transitory computer-readable medium described herein, the control message may be transmitted based on the measurements for the set of beams corresponding to the secondary sidelink carrier being higher than measurements for a second set of beams corresponding to the primary sidelink carrier.

In some examples of the method, apparatuses, and non-transitory computer-readable medium described herein, the control message may be transmitted prior to a BFD procedure based on the beam failure instance.

Some examples of the method, apparatuses, and non-transitory computer-readable medium described herein may further include operations, features, means, or instructions for initiating a BFD procedure based on the beam failure instance, where the control message may be transmitted during the BFD procedure.

Some examples of the method, apparatuses, and non-transitory computer-readable medium described herein may further include operations, features, means, or instructions for initiating a BFR procedure based on a quantity of beam failure instances satisfying a threshold, where the control message may be transmitted during the BFR procedure.

In some examples of the method, apparatuses, and non-transitory computer-readable medium described herein, the measurement message may be received based on a quantity of beam failure instances satisfying a threshold.

Some examples of the method, apparatuses, and non-transitory computer-readable medium described herein may further include operations, features, means, or instructions for receiving a second control message indicating a BFD and initiating a first BFR timer based on the BFD.

Some examples of the method, apparatuses, and non-transitory computer-readable medium described herein may further include operations, features, means, or instructions for detecting an expiration of the first BFR timer, where transmitting the control message may be based on the expiration of the first BFR timer.

In some examples of the method, apparatuses, and non-transitory computer-readable medium described herein, the first BFR timer may be associated with beam reselection.

Some examples of the method, apparatuses, and non-transitory computer-readable medium described herein may further include operations, features, means, or instructions for detecting an expiration of the first BFR timer and initiating a second BFR timer associated with performing a random access procedure for the primary sidelink carrier.

In some examples of the method, apparatuses, and non-transitory computer-readable medium described herein, the primary sidelink carrier corresponds to a first frequency range, and the secondary sidelink carrier corresponds to a second frequency range.

In some examples of the method, apparatuses, and non-transitory computer-readable medium described herein, the primary sidelink carrier corresponds to a first radio frequency spectrum band in a radio frequency range and the secondary sidelink carrier corresponds to a second radio frequency spectrum band in the radio frequency range.

In some examples of the method, apparatuses, and non-transitory computer-readable medium described herein, the primary sidelink carrier and the secondary sidelink carrier correspond to a same radio frequency spectrum band.

A method for wireless communications at a first UE is described. The method may include transmitting a first set of reference signals via a primary sidelink carrier of a sidelink carrier aggregation configuration and a second set of reference signals via one or more secondary sidelink carriers of the sidelink carrier aggregation configuration, initiating a first timer associated with BFR based on a BFD for the primary sidelink carrier, and transmitting a set of BFR reference signals via one or more beams of the primary sidelink carrier while the first timer associated with BFR is active.

An apparatus for wireless communications at a first UE is described. The apparatus may include a processor and a memory coupled with the processor. The memory may include instructions which are executable by the processor to cause the apparatus to transmit a first set of reference signals via a primary sidelink carrier of a sidelink carrier aggregation configuration and a second set of reference signals via one or more secondary sidelink carriers of the sidelink carrier aggregation configuration, initiate a first timer associated with BFR based on a BFD for the primary sidelink carrier, and transmit a set of BFR reference signals via one or more beams of the primary sidelink carrier while the first timer associated with BFR is active.

Another apparatus for wireless communications at a first UE is described. The apparatus may include means for transmitting a first set of reference signals via a primary sidelink carrier of a sidelink carrier aggregation configuration and a second set of reference signals via one or more secondary sidelink carriers of the sidelink carrier aggregation configuration, means for initiating a first timer associated with BFR based on a BFD for the primary sidelink carrier, and means for transmitting a set of BFR reference signals via one or more beams of the primary sidelink carrier while the first timer associated with BFR is active.

A non-transitory computer-readable medium storing code for wireless communications at a first UE is described. The code may include instructions executable by a processor to transmit a first set of reference signals via a primary sidelink carrier of a sidelink carrier aggregation configuration and a second set of reference signals via one or more secondary sidelink carriers of the sidelink carrier aggregation configuration, initiate a first timer associated with BFR based on a BFD for the primary sidelink carrier, and transmit a set of BFR reference signals via one or more beams of the primary sidelink carrier while the first timer associated with BFR is active.

Some examples of the method, apparatuses, and non-transitory computer-readable medium described herein may further include operations, features, means, or instructions for initiating a second timer associated with BFR based on an expiration of the first timer and performing a random access procedure for the primary sidelink carrier while the second timer may be active.

Some examples of the method, apparatuses, and non-transitory computer-readable medium described herein may further include operations, features, means, or instructions for receiving a control message indicating the BFD for the primary sidelink carrier based on a quantity of beam failure instances satisfying a threshold, where initiating the first timer may be based on the control message indicating the BFD.

Some examples of the method, apparatuses, and non-transitory computer-readable medium described herein may further include operations, features, means, or instructions for detecting a beam failure of the primary sidelink carrier based on a beam failure timer at the first UE exceeding a threshold.

In some examples of the method, apparatuses, and non-transitory computer-readable medium described herein, transmitting the set of BFR reference signals may include operations, features, means, or instructions for transmitting the set of BFR reference signals via a subset of BFR reference signal resources from a set of BFR reference signal resources.

A method for wireless communications at a second UE is described. The method may include receiving a first set of reference signals via a primary sidelink carrier of a sidelink carrier aggregation configuration and a second set of reference signals via one or more secondary sidelink carriers of the sidelink carrier aggregation configuration, transmitting, based on the first set of reference signals and the second set of reference signals, a measurement message indicating measurements for a set of beams corresponding to a secondary sidelink carrier of the sidelink carrier aggregation configuration based on a beam failure instance for the primary sidelink carrier, and receiving, via Layer 1 signaling or Layer 2 signaling, a control message indicating to switch the primary sidelink carrier to the set of beams based on the measurements for the set of beams and the beam failure instance for the primary sidelink carrier.

An apparatus for wireless communications at a second UE is described. The apparatus may include a processor and a memory coupled with the processor. The memory may include instructions which are executable by the processor to cause the apparatus to receive a first set of reference signals via a primary sidelink carrier of a sidelink carrier aggregation configuration and a second set of reference signals via one or more secondary sidelink carriers of the sidelink carrier aggregation configuration, transmit, based on the first set of reference signals and the second set of reference signals, a measurement message indicating measurements for a set of beams corresponding to a secondary sidelink carrier of the sidelink carrier aggregation configuration based on a beam failure instance for the primary sidelink carrier, and receive, via Layer 1 signaling or Layer 2 signaling, a control message indicating to switch the primary sidelink carrier to the set of beams based on the measurements for the set of beams and the beam failure instance for the primary sidelink carrier.

Another apparatus for wireless communications at a second UE is described. The apparatus may include means for receiving a first set of reference signals via a primary sidelink carrier of a sidelink carrier aggregation configuration and a second set of reference signals via one or more secondary sidelink carriers of the sidelink carrier aggregation configuration, means for transmitting, based on the first set of reference signals and the second set of reference signals, a measurement message indicating measurements for a set of beams corresponding to a secondary sidelink carrier of the sidelink carrier aggregation configuration based on a beam failure instance for the primary sidelink carrier, and means for receiving, via Layer 1 signaling or Layer 2 signaling, a control message indicating to switch the primary sidelink carrier to the set of beams based on the measurements for the set of beams and the beam failure instance for the primary sidelink carrier.

A non-transitory computer-readable medium storing code for wireless communications at a second UE is described. The code may include instructions executable by a processor to receive a first set of reference signals via a primary sidelink carrier of a sidelink carrier aggregation configuration and a second set of reference signals via one or more secondary sidelink carriers of the sidelink carrier aggregation configuration, transmit, based on the first set of reference signals and the second set of reference signals, a measurement message indicating measurements for a set of beams corresponding to a secondary sidelink carrier of the sidelink carrier aggregation configuration based on a beam failure instance for the primary sidelink carrier, and receive, via Layer 1 signaling or Layer 2 signaling, a control message indicating to switch the primary sidelink carrier to the set of beams based on the measurements for the set of beams and the beam failure instance for the primary sidelink carrier.

Some examples of the method, apparatuses, and non-transitory computer-readable medium described herein may further include operations, features, means, or instructions for receiving sidelink control information via the set of beams based on switching the primary sidelink carrier to the set of beams.

In some examples of the method, apparatuses, and non-transitory computer-readable medium described herein, the control message may be received prior to a BFD procedure based on the beam failure instance.

Some examples of the method, apparatuses, and non-transitory computer-readable medium described herein may further include operations, features, means, or instructions for initiating a BFD procedure based on the beam failure instance, where the control message may be received during the BFD procedure.

Some examples of the method, apparatuses, and non-transitory computer-readable medium described herein may further include operations, features, means, or instructions for initiating a BFR procedure based on a quantity of beam failure instances satisfying a threshold, where the control message may be received during the BFR procedure.

Some examples of the method, apparatuses, and non-transitory computer-readable medium described herein may further include operations, features, means, or instructions for determining a quantity of beam failure instances satisfies a threshold, where transmitting the measurement message may be based on the quantity of beam failure instances satisfying the threshold.

A method for wireless communications at a second UE is described. The method may include receiving a first set of reference signals via a primary sidelink carrier of a sidelink carrier aggregation configuration and a second set of reference signals via one or more secondary sidelink carriers of the sidelink carrier aggregation configuration, initiating a first timer associated with BFR based on a BFD for the primary sidelink carrier, and monitoring for a set of BFR reference signals via one or more beams of the primary sidelink carrier while the first timer associated with BFR is active.

An apparatus for wireless communications at a second UE is described. The apparatus may include a processor and a memory coupled with the processor. The memory may include instructions which are executable by the processor to cause the apparatus to receive a first set of reference signals via a primary sidelink carrier of a sidelink carrier aggregation configuration and a second set of reference signals via one or more secondary sidelink carriers of the sidelink carrier aggregation configuration, initiate a first timer associated with BFR based on a BFD for the primary sidelink carrier, and monitor for a set of BFR reference signals via one or more beams of the primary sidelink carrier while the first timer associated with BFR is active.

Another apparatus for wireless communications at a second UE is described. The apparatus may include means for receiving a first set of reference signals via a primary sidelink carrier of a sidelink carrier aggregation configuration and a second set of reference signals via one or more secondary sidelink carriers of the sidelink carrier aggregation configuration, means for initiating a first timer associated with BFR based on a BFD for the primary sidelink carrier, and means for monitoring for a set of BFR reference signals via one or more beams of the primary sidelink carrier while the first timer associated with BFR is active.

A non-transitory computer-readable medium storing code for wireless communications at a second UE is described. The code may include instructions executable by a processor to receive a first set of reference signals via a primary sidelink carrier of a sidelink carrier aggregation configuration and a second set of reference signals via one or more secondary sidelink carriers of the sidelink carrier aggregation configuration, initiate a first timer associated with BFR based on a BFD for the primary sidelink carrier, and monitor for a set of BFR reference signals via one or more beams of the primary sidelink carrier while the first timer associated with BFR is active.

Some examples of the method, apparatuses, and non-transitory computer-readable medium described herein may further include operations, features, means, or instructions for initiating a second timer associated with BFR based on an expiration of the first timer and performing a random access procedure for the primary sidelink carrier while the second timer may be active.

Some examples of the method, apparatuses, and non-transitory computer-readable medium described herein may further include operations, features, means, or instructions for transmitting a control message indicating the BFD for the primary sidelink carrier based on a quantity of beam failure instances satisfying a threshold, where initiating the first timer may be based on the control message indicating the BFD.

In some examples of the method, apparatuses, and non-transitory computer-readable medium described herein, transmitting the set of BFR reference signals may include operations, features, means, or instructions for monitoring for the set of BFR reference signals via a subset of BFR reference signal resources from a set of BFR reference signal resources.

DETAILED DESCRIPTION

Figure 1:
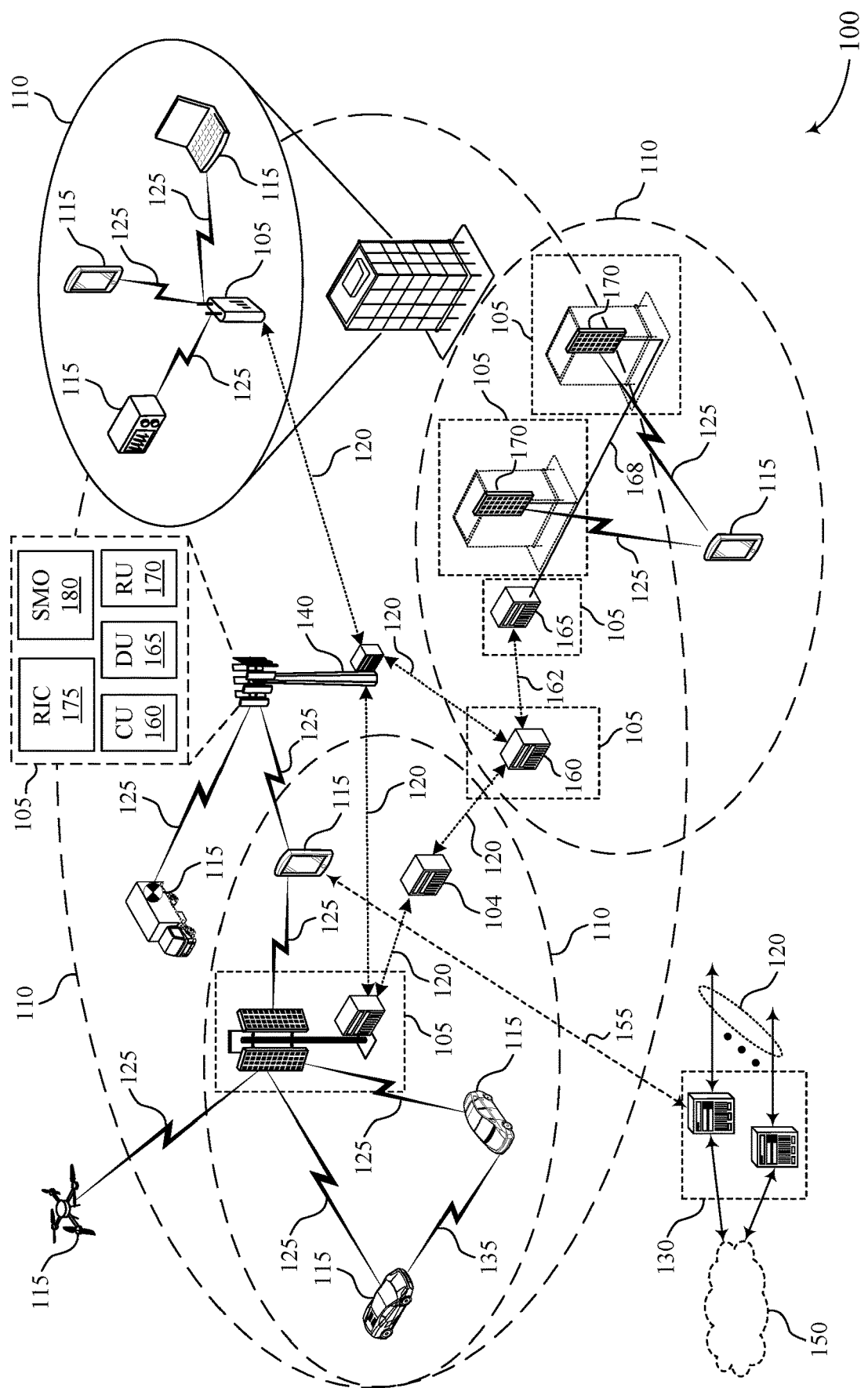
FIG. 1 illustrates an example of a wireless communications system that supports techniques for primary sidelink carrier updating in sidelink carrier aggregation in accordance with one or more aspects of the present disclosure.

In some wireless communications systems, a first user equipment (UE) may communicate with a second UE using sidelink carrier aggregation, where the first UE and the second UE may communicate via a primary sidelink carrier and one or more secondary sidelink carriers. The primary sidelink carrier may be used for control signaling and the secondary sidelink carriers may be used for data and control signaling. In some cases, a secondary sidelink carrier may be removed, activated, or deactivated based on throughput. During communications between the first UE and the second UE, radio link monitoring (RLM) and radio resource failure (RLF) may be managed and declared via the primary sidelink carrier but not the secondary sidelink carrier. In some cases, if the primary sidelink carrier experiences beam failure or performs beam failure recovery (BFR), a UE may perform a random access procedure to reestablish the primary sidelink carrier. If the random access procedure is unsuccessful, the UE may declare RLF. However, declaring RLF on the primary sidelink carrier may suspend the signaling for other secondary sidelink carriers and may cause an increase in delay of communications between the first UE and the second UE.

In some examples, a UE may perform independent beam management procedures per component carrier. In some cases, a transmitting UE may configure and transmit beam failure detection (BFD) reference signals (BFD-RSs) on a primary sidelink carrier and secondary sidelink carriers independently. In some examples, if a primary sidelink carrier experiences beam failure, but one of the secondary sidelink carriers is available, the UE may switch the primary sidelink carrier to one of the available secondary carriers. For example, in cases where another secondary sidelink carrier is available, the transmitting UE may perform a primary sidelink carrier beam change, switch, or reselection by conveying assistance information to the receiving UE via a secondary sidelink carrier.

Techniques, systems, and methods of the present disclosure may support performing the primary sidelink carrier switch at different times with respect to BFD and BFR procedures. In some cases, the transmitting UE may start BFR and may attempt a random access procedure to recover the primary sidelink carrier. In cases where the random access procedure is unsuccessful, but one of the secondary sidelink carriers is available, the UE may attempt to change the primary sidelink carrier to one of the available secondary sidelink carriers. In some examples, relating to techniques described elsewhere herein, the transmitting UE may change the primary sidelink carrier prior to detecting beam failure and performing BFD procedures. For example, if the UE determines that a secondary sidelink carrier is of a higher quality than the primary sidelink carrier prior to detecting beam failure and performing BFR, the UE may change the primary sidelink carrier to the secondary sidelink carrier. In some other example, the transmitting UE may change the primary sidelink carrier prior to performing the random access procedure during BFR. In some examples described herein, the transmitting UE and the receiving UE may initiate timers for BFR, where the transmitting UE and receiving UE switch between stages of BFR and BFD based on the timers. For example, the transmitting UE or the receiving UE, or both, may start a first timer during BFR when performing a beam reselection for the primary sidelink carrier. If the first timer expires, the UEs may move to a next stage of a BFR procedure and start a second timer for performing a random access procedure for the primary sidelink carrier prior to declaring RLF.

Aspects of the disclosure are initially described in the context of wireless communications systems. Aspects of the disclosure are further illustrated by and described with reference to apparatus diagrams, system diagrams, and flowcharts that relate to techniques for primary sidelink carrier updating in sidelink carrier aggregation.

FIG. 1 illustrates an example of a wireless communications system 100 that supports techniques for primary sidelink carrier updating in sidelink carrier aggregation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both.

For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent TAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the TAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for primary sidelink carrier updating in sidelink carrier aggregation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some cases, the wireless communications system 100 may support mmW signaling for sidelink communications. For example, the wireless communications system 200 may support mmW sidelink communications for Network, Communication, & Information Systems (NCIS) and extended reality (XR), which may have high throughputs and low latencies. Additionally, or alternatively, the wireless communications system 200 may offload Uu traffic from a Uu link to a sidelink, which may increase spectrum utilization efficiency and reduce latency. Using mmW communications (e.g., in Frequency Range 2, Frequency Range 2x, Frequency Range 4, etc.) via a sidelink may support high throughput and low latency communications.

In some examples, for the wireless communications system may support beam management for sidelink, such as beam management for mmW sidelink communications. Beam management procedures may compensate for larger pathlosses in mmW communications. Beam management may include initial beam pairing, beam maintenance, indication, and updates and BFR, among other procedures. Such procedures may benefit from mmW sidelink communication opposed to Uu link communications between a UE 115 and a network entity 105, as communications may be offloaded from the Uu link, freeing up space for other communications.

In some examples, mmW sidelink communications may support carrier aggregation. Carrier aggregation may be a technique used to increase the throughput (e.g., increase the rate of data transmission over a given time period) by supporting a larger bandwidth than other techniques. In some cases, mmW communications for carrier aggregation may be used for component carrier activation/deactivation, cross-carrier grants and beam indications, and multi-bit HARQ-ACK feedback, among signaling. In some cases, mmW sidelink communications may support intra-band or inter-band sidelink carrier aggregation, with the same or different component carriers for both Uu and sidelink communications. As such, beam management, carrier aggregation, and other procedures conventionally performed on the Uu link may be performed using sidelink communications, including mmW sidelink communications, to increase efficiency and throughput and reduce load on Uu links.

In some examples, the Uu link carrier aggregation may perform procedures over different cells. For example, Uu link carrier aggregation may include a primary cell (PCell) and one or more secondary cells (SCells). SCells may be added and removed or activated and deactivated from the Uu link without any additional procedures, however changing the PCell may constitute a cell handover procedure. A UE 115 may make measurements on the SCells of a Uu carrier aggregation scheme, but the PCell may declare or perform RLM and radio link failure RLF. In some examples, the PCell and a PUCCH-SCell may carry PUCCH messages, while other SCells may not be used to transmit uplink control signaling. In some examples, random access channel (RACH) resources may be available on the PCell but not SCells. In some examples, for a master cell group (MCG), SCells may become dormant, but the PCell may remain active to sustain the connection between the wireless devices.

In some cases, the Uu link may perform procedures such as BFD procedures between a UE 115 and the network entity 105. In some cases, the network entity 105 may configure the UE 115 for BFD via MAC entity per serving cell in communication with the UE 115. The UE 115 may be configured with a beam failure instance (BFI) counter (e.g., BFI COUNTER), which may be initially set to zero and a BFD timer (e.g., beamFailureDetectionTimer). Upon detection of a beam failure, the BFD timer may reset, and the beam failure instance counter may increment by one. If the beam failure instance counter satisfies a threshold or reaches a beam failure instance maximum (e.g., beamFialureInstanceMaxCount) and the serving cell associated with the beam failure instance counter is an SCell, the device (e.g., the network entity 105 or the UE 115) may initiate a BFR procedure. If the serving cell is not an SCell (e.g., the serving cell is a PCell), the device may initiate a RACH procedure on a secondary cell group (e.g., a group of SCells) to select a new serving cell from the secondary cell group (e.g., an SCell to replace the PCell).

In some examples, the BFD timer may expire, and the device may reset the beam failure instance counter to zero.

In some examples, the BFD timer, the beam failure maximum count, or a reference signal used for BFD may be reconfigured by upper layers associated with the serving cell, and the device may reset the beam failure instance counter to zero. If the serving cell is a primary cell, and a random access procedure initiated for BFR for the primary cell is successful, the device may reset the beam failure instance counter to zero, stop the BFR timer, and consider the BFR procedure successful. In some examples, the serving cell is an SCell, and PDCCH addressed to a cell radio network temporary identifier (C-RNTI) indicating an uplink grant for a new transmission (e.g., a transmission for a HARQ process used for the transmission of the BFR MAC control element (MAC CE) or truncated BFR MAC-CE, which may contain BFR information of the serving cell) is received, or the device receives an indication that the SCell has been deactivated. As such, the device may reset the beam failure instance counter to zero, consider the BFR procedure successful and complete, and cancel all triggered BFR procedures for the serving cell. Using such techniques, a UE 115 may perform BFD and BFR procedures with the network entity 105, however such procedures may be time consuming and may cause increase overhead on the Uu link.

Wireless communications systems described herein, such as the wireless communications system 100, may support a UE 115 to perform BFD and BFR procedures over a sidelink channel with another UE 115 to reduce overhead on the Uu link. The sidelink channel may be an example of a PC5-RRC connection established between the UE 115-a and the UE 115-b in a given direction.

In some wireless communications systems, a first UE 115 may communicate with a second UE 115 using sidelink carrier aggregation, where the first UE 115 and the second UE 115 may communicate via a primary sidelink carrier and one or more secondary sidelink carriers. The primary sidelink carrier may be used for control signaling and the secondary sidelink carriers may be used for data and control signaling. In some cases, a secondary sidelink carrier may be removed, activated, or deactivated based on throughput. During communications between the first UE 115 and the second UE 115, RLM and RL) may be managed and declared via the primary sidelink carrier but not the secondary sidelink carrier. In some cases, if the primary sidelink carrier experiences beam failure or performs BFR, a UE 115 may perform a random access procedure to reestablish the primary sidelink carrier. If the random access procedure is unsuccessful, the UE 115 may declare RLF. However, declaring RLF on the primary sidelink carrier may suspend the signaling for other secondary sidelink carriers and may cause an increase in delay of communications between the first UE 115 and the second UE 115.

In some examples, a UE 115 may perform independent beam management procedures per component carrier. In some cases, a transmitting UE 115 may configure and transmit BFD-RSs on primary sidelink carriers and secondary sidelink carriers independently. In some examples, if a primary sidelink carrier experiences beam failure, but one of the secondary sidelink carriers may be available, the UE 115 may switch the primary sidelink carrier to one of the available secondary carriers. For example, in cases where another secondary sidelink carrier may be available, the transmitting UE 115 may perform a primary sidelink carrier beam change, switch, or reselection by conveying assistance information to the receiving UE 115 via a secondary sidelink carrier.

Techniques, systems, and methods of the present disclosure may support performing the primary sidelink carrier switch at different times with respect to BFD and BFR procedures. In some cases, the transmitting UE 115 may start BFR and may attempt a random access procedure to recover the primary sidelink carrier. In cases where the random access procedure may be unsuccessful, but one of the secondary sidelink carriers may be available, the UE 115 may attempt to change the primary sidelink carrier to one of the available secondary sidelink carriers. In some examples, relating to techniques described elsewhere herein, the transmitting UE 115 may change the primary sidelink carrier prior to detecting beam failure and performing BFD procedures. For example, if the UE 115 determines that a secondary sidelink carrier may be of a higher quality than the primary sidelink carrier prior to detecting beam failure and performing BFR, the UE 115 may change the primary sidelink carrier to the secondary sidelink carrier. In some other example, the transmitting UE 115 may change the primary sidelink carrier prior to performing the random access procedure during BFR. In such examples, the transmitting UE 115 and the receiving UE 115 may initiate timers for BFR, where the transmitting UE 115 and receiving UE 115 switch between stages of BFR and BFD based on the timers. Such procedures of the UE 115 initiating BFR timers during the BFD and BFR procedures and performing the change to the primary sidelink carrier prior to BFD or BFR, or during BFD or BFR may be described elsewhere herein, including with reference to FIGS. 3-8.

Figure 2:
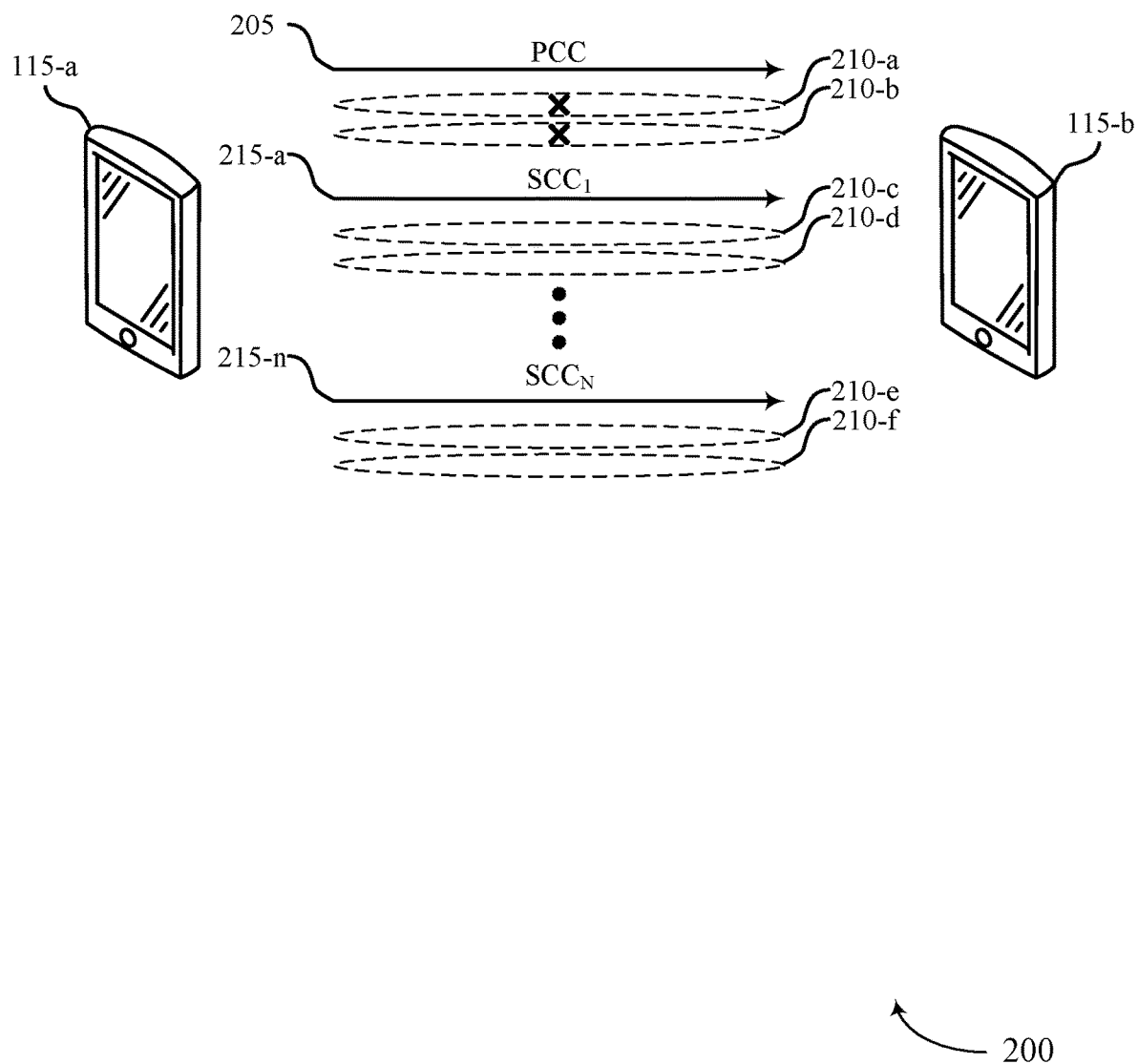
FIG. 2 illustrates an example of a wireless communications system that supports techniques for primary sidelink carrier updating in sidelink carrier aggregation in accordance with one or more aspects of the present disclosure.

FIG. 2 illustrates an example of a wireless communications system 200 that supports techniques for primary sidelink carrier updating in sidelink carrier aggregation in accordance with one or more aspects of the present disclosure. In some examples, the wireless communications system 200 may implement or be implemented by the wireless communications system 100. For example, the wireless communications system 200 may include a UE 115-a and a UE 115-b which may represent examples of corresponding devices described herein (e.g., with reference to FIG. 1). In some cases, the UE 115-a and the UE 115-b may communicate via a communication link, which may be an example of a sidelink or the communication link 125 described with reference to FIG. 1.

In some examples of the wireless communications system 200, mmW sidelink communications may implement carrier aggregation. In some cases, the carrier aggregation may include sidelink carrier aggregation of a sidelink channel. The sidelink channel may include a primary component carrier (PCC) (e.g., such as a PCC 205) and one or more secondary component carriers (SCCs) (e.g., such as a first SCC 215-a to an nth SCC 215-n). The PCC 205 may be an example of a primary sidelink carrier, a primary sidelink cell, or a primary sidelink component carrier described herein. An SCC 215 may be an example of a secondary sidelink carrier, a secondary sidelink cell, or a secondary sidelink component carrier described herein.

In some examples, the PCC 205 and the SCCs 215 may be configured in different radio frequency spectrum bands or radio frequency ranges. For example, the PCC 205 may be configured in a first frequency range (e.g., Frequency Range 1 (FR1)) and the SCCs 215 may be configured in a second frequency range (e.g., Frequency Range 2 (FR2)). In some cases, the PCC 205 may correspond to a first radio frequency spectrum band in a radio frequency range (e.g., FR2) and the SCCs 215 may correspond to a second radio frequency spectrum band in the same radio frequency range, or the PCC 205 and the SCCs 215 may correspond to a same radio frequency spectrum band in a same radio frequency range.

The PCC 205 may be defined per transmitting UE 115 (e.g., such as the UE 115-a) per sidelink channel. The sidelink channel from the UE 115-a to the UE 115-b may be configured with the PCC 205, and a sidelink channel from the UE 115-b to the UE 115-a may be configured with a separate PCC. For example, a second PC5-RCC connection may be established between the UE 115-a and the UE 115-b from the direction of the UE 115-b to the UE 115-a. In some cases, the UE 115-a may perform RACH procedures on the PCC 205 but not on SCCs 215. Performing the RACH on the PCC 205 may enable BFR procedures. In some examples, the UE 115-a may perform RLM or declare RLF on the PCC 205. In some examples, the UE 115-a may transmit SSBs on the PCC 205. For example, the UE 115-a may transmit SSBs periodically, semi-periodically, or aperiodically, based on power limitation and interference mitigation metrics configured at the UE 115-a.

The SCCs 215 may also be defined per transmitting UE 115 per sidelink channel. In some cases, BFR procedures on the SCCs 215 may include a beam change based on measurements, which may be performed on BFR reference signals (BFR-RS) or BFD BFD-RS 210. In some examples, the UE 115-a may transmit SSBs via an SCC 215 periodically, semi-periodically, or aperiodically, based on power limitation and interference mitigation metrics configured at the UE 115-a.

UEs 115 communicating via sidelink carrier aggregation may perform independent beam management procedures. For example, beam management procedures for sidelink carrier aggregation may be performed per-direction and per-component carrier. Each transmitting UE 115 may configure and transmit a BFD-RS set on a PCC and a set of SCCs independently. For example, the UE 115-a may configure and transmit sets of BFD-RS on the PCC 205 and the SCCs 215. For example, a BFD-RS set of the PCC 205 may include BFD-RS 210-a and BFD-RS 210-b, the BFD-RS set of the first SCC 215-a may include BFD-RS 210-c and BFD-RS 210-d, and the BFD-RS set of the nth SCC 215-n may include BFD-RS 210-e and BFD-RS 210-f. In some cases, a BFD-RS 210 may be an example of an SSB or a CSI-RS used for BFD. The UE 115-b may perform measurements on the beam sets of the BFD-RSs 210 configured for the PCC 205 and SCCs 215. If the UE 115-b detects that a measurement for a BFD-RS 210 in the BFD-RS set for a component carrier is below a threshold, the UE 115-b may increment the beam failure instance counter associated with that component carrier. For example, if all beams in the configured BFD-RS set for a component carrier have measurements below a configured threshold, the beam failure instance counter associated with that component carrier may be incremented.

The UE 115-b may be configured with a BFD-RS 210 measurement threshold, a beam failure instance counter, and a beam failure instance counter maximum value to detect beam failure. In some examples, the beam failure instance counter maximum may be equal to one less than a quantity of BFD-RSs 210 in the set associated with the component carrier. Beam failure may be detected when the beam failure instance counter is above the beam failure instance counter maximum value, and the UE 115-b may report a BFD indication (e.g., via a MAC-CE) to the UE 115-a. For example, the UE 115-b may be configured with a beam failure instance counter maximum value of X, and the UE 115-b may detect that the RSRP of X+1 BFD-RSs are below the measurement threshold. When the UE 115-b increments the beam failure instance counter, the beam failure instance counter may exceed the beam failure instance counter maximum value, indicating beam failure on the corresponding component carrier.

Techniques of the present disclosure support a transition procedure from the PCC 205 to one of the SCCs 215 in conjunction with the BFD and BFR procedures. Upon indication of the BFD at the UE 115-*b*, the UE 115-*a* may determine to perform a PCC beam change, switch, or reselection, based on an SCC 215 being available. In some examples, the UE 115-*a* may perform the PCC beam change by transmitting, or conveying, assistance information to the UE 115-*b* via lower layer signaling (e.g., via a MAC-CE) on the SCC 215. In some cases, the PCC beam reselection may not be successful, and the UE 115-*b* may perform a RACH procedure to recover the PCC 205. In some examples, for a more efficient and faster RACH procedure, the UE 115-*a* may transmit BFD-RSs 210 to the UE 115-*b*. The UE 115-*b* may perform the RACH procedure, and the UE 115-*a* may transmit a RACH response on the PCC 205 to the UE 115-*b* so the UEs 115 may perform beam refinement procedures.

In some examples, to save power and avoid interference to other neighboring UEs 115, the UE 115-*a* may enter a power savings mode. In the power savings mode, the UE 115-*a* may only transmit a limited BFD-RS beam set (e.g., SSBs or control state information reference signals (CSI-RSs) for BFD) and transmit the SSBs (e.g., for initial discovery of beams or rediscovery of beams) aperiodically, based on a trigger (e.g., such as a beam failure instance). However, if the UE 115-*b* indicates a beam failure (e.g., a BFD) to the UE 115-*a*, the UE 115-*a* may transmit a full BFD-RS beam set on the PCC 205 for the UE 115-*b* to perform RACH procedures. In some other examples, the UE 115-*a* may detect a lack of neighboring UEs 115 and may enter a performance mode. In the performance mode, the UE 115-*a* may transmit SSBs periodically along with the full BFD-RS set. In some cases, the performance mode may be robust against symmetric failures as the SSBs may already be available for RACH procedures and there may not be any additional triggers or transmissions for the UE 115-*b* to perform RACH procedures, therefore reducing delay and latency when performing BFR procedures.

Wireless communications systems described herein, such as the wireless communications system 200, may support techniques for sidelink BFD and BFR. For example, the UE 115-*a* may perform a PCC cell change, where the UE 115-*a* switches the PCC 205 to a component carrier (e.g., an SCC 215) with reliable performance. The wireless communications system 200 may support multiple options or timings for performing the PCC cell change. In a first example, the UE 115-*a* may switch to a component carrier with a reliable performance to prevent RLF, such as a component carrier in FR2. For example, if there is a strong interference to the PCC 205 (e.g., in FR1), the UE 115-*a* may switch the PCC 205 to an available and reliable SCC (e.g., in FR2). In a second example, the UE 115-*a* may switch to a component carrier with reliable performance using Layer 1 (L1) or Layer 2 (L2) signaling and prior to performing BFR. In a third example the UE 115-*a* may switch to a component carrier with a reliable performance using L1 or L2 signaling after performing BFR but prior to performing a random access procedure. For example, the PCC change may be triggered before BFD or BFR if an SCC 215 outperforms the PCC 205, during BFD or BFR (e.g., based on L1 or L2 mobility), or after BFR but before performing a random access procedure or declaring RLF. The PCC change may be inter-band between frequency range 1 to 2, inter-band from frequency range 2 to 2, or intra-band from frequency range 2 to 2. Further description of the BFD/BFR procedures and the PCC 205 change may be described with reference to FIGS. 3-8.

Some techniques described herein may be implemented for BFD and BFR when the PCC 205 is defined per transmit UE 115 per sidelink channel for mode 2 sidelink operations. In some cases, a UE 115, such as the UE 115-*a* or the UE 115-*b*, may use separate timers for different procedures during BFR, such as using a first timer for beam reselection and a second timer for RACH procedures for the PCC 205. In some examples, the UE 115-*a* may transmit BFR-RSs, CSI-RS, or SSBs aperiodically to reduce energy consumption (e.g., while operating in a power savings mode) or periodically to reduce latencies (e.g., performance mode) in beam refinement procedures.

Figure 3:
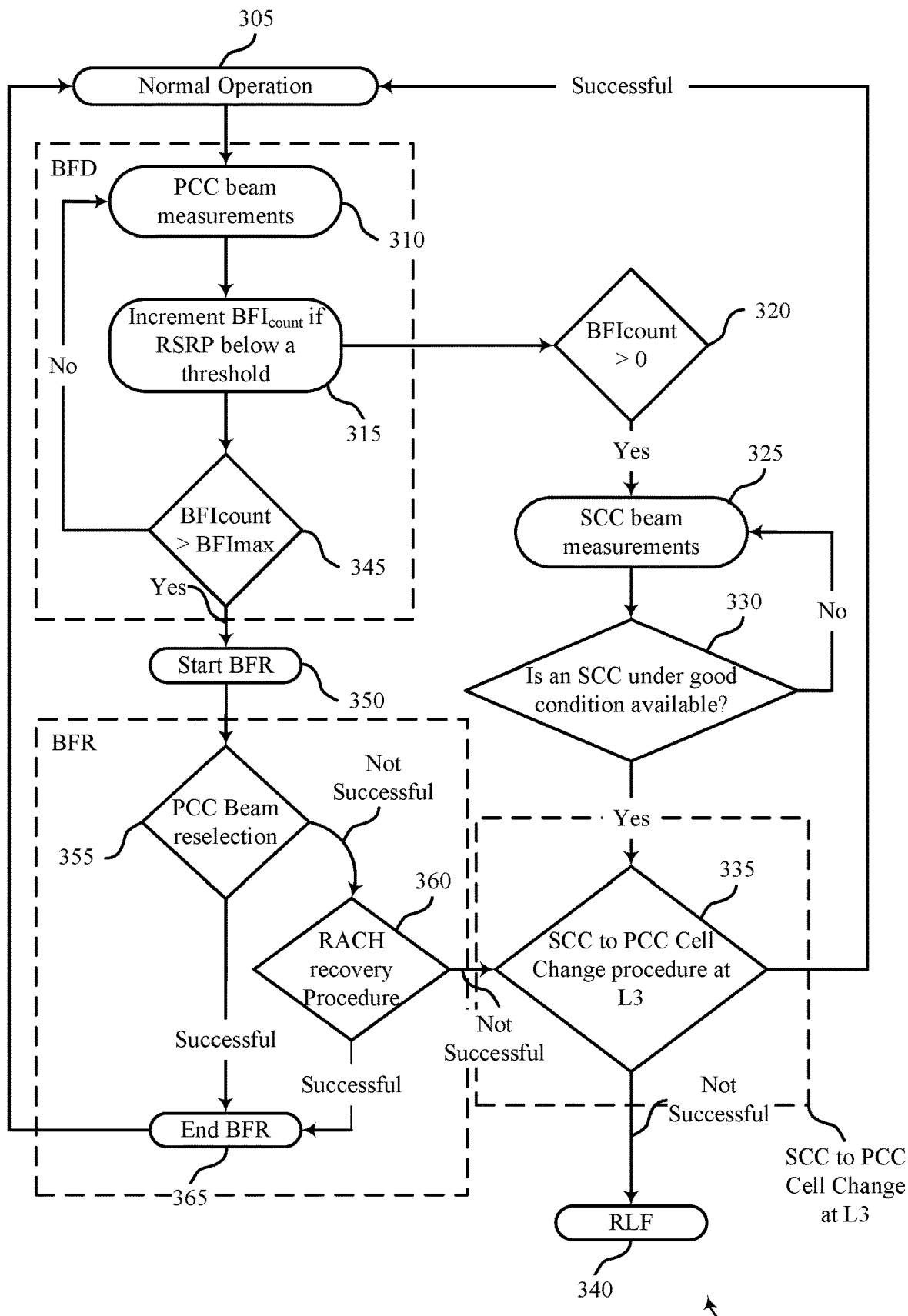
FIG. 3 illustrates an example of a flow diagram that supports techniques for primary sidelink carrier updating in sidelink carrier aggregation in accordance with one or more aspects of the present disclosure.

FIG. 3 illustrates an example of a flow diagram 300 that supports techniques for primary sidelink carrier updating in sidelink carrier aggregation in accordance with one or more aspects of the present disclosure.

In some examples, the flow diagram 300 may implement or be implemented by the wireless communications system 100 or the wireless communications system 200. The flow diagram 300 may describe switching a primary sidelink carrier, such as a PCC, to a secondary sidelink component carrier, such as a secondary sidelink carrier or an SCC, with reliable performance to prevent RLF. In such cases, a first, or transmitting, UE 115 may detect a strong interference to a PCC (e.g., in a mode 2 mobility scenario), and the first UE 115 may switch to an available SCC to use as the PCC. The PCC and the SCCs may be examples of the PCC 205 and the SCCs 215 described with reference to FIG. 2. In some cases, the UE 115 may be configured with a group of SCCs including one or more SCCs.

At 305, two UEs 115 in sidelink communications may perform normal operations, exchanging control signaling and data messages bi-directionally. A first UE 115 may transmit a reference signal, such as a BFD-RS, a CSI-RS, an SSB, or any combination thereof, which may be received by a second UE 115, and the second UE 115 may detect that a measurement of the reference signal is below a measurement threshold. In some examples, the first UE 115 or the second UE 115, or both, may trigger a beam reselection process based on the measurement being below the measurement threshold. In some examples, the UEs 115 may initiate a BFD procedure. For example, the first UE 115 may transmit BFD-RSs (e.g., SSBs, CSI-RSs) to be measured by the second UE 115.

At 310, the UEs 115 may perform beam measurements on the BFD-RSs. For example, the first UE 115 may transmit a set of BFD-RSs to the second UE 115 via beams of the PCC, and the second UE 115 may measure the set of BFD-RSs. In some examples, an RSRP of one of the BFD-RSs on the PCC may be below the measurement threshold, which may indicate a beam failure instance, and the second UE 115 may increment a beam failure instance counter at 315. In some examples, the second UE 115 may transmit a measurement report for the PCC beam measurements, indicating the beam failure instance or the measurements for the PCC beams, or both.

In some cases, at 320, the UEs 115 may detect the beam failure instance counter value is above zero but below a maximum beam failure instance value. At 325, the first UE 115 may transmit BFD-RSs on beams of SCCs configured for the first UE 115. The second UE 115 may receive the BFD-RSs and perform SCC beam measurements. In some examples, the second UE 115 may transmit a measurement report to the first UE 115, which may indicate the SCC beam measurements.

At 330, the first UE 115 or the second UE 115, or both, may compare the beam measurements of an SCC in the SCC group to measurements of the PCC beams. If the UEs 115 determine that none of the SCCs available have sufficient conditions to replace the PCC, the UEs 115 may perform additional beam measurements on subsequent SCCs of the group of SCCs (e.g., the UE 115 may repeat 325). In some examples, if the UEs 115 determine that none of the SCCs are in good condition, or can support the PC5-RRC link, the UEs may return to performing PCC beam measurements on the next PCC beam. In some examples, the first UE 115 or the second UE 115, or both, may determine a measured SCC can be used instead of the current PCC. If the UEs 115 determine that an available SCC is in good condition, (e.g., the SCC may sustain the PC5-RRC sidelink channel), the UEs 115 may initiate an SCC to PCC cell change procedure at 335. The UEs 115 may initiate the SCC to PCC cell change procedure and return to normal operations without performing entire BFD or BFR procedures.

As such, the SCC to PCC cell change procedure may reduce overhead and latency on the PC5-RRC sidelink channel. If the cell change procedure is not successful, the first UE 115 may declare RLF at 340. If the first UE 115 reports RLF, the UEs 115 may drop the PC5-RRC sidelink connection and may attempt to reestablish the connection. However, the techniques described herein may enable the UEs 115 to report RLF earlier than if the UEs 115 had performed the complete BFD and BFR procedures, therefore reducing the overall delay in sidelink communications.

If the SCC to PCC cell change procedure is successful, at 335, the UEs 115 may return to normal operations at 305. The first UE 115 may change from transmitting over the previous beams of PCC to the beams of the selected SCC. In some cases, the first UE 115 may switch to using the beams of the SCC as a new PCC, as the SCC may outperform the previous PCC, and the SCC may sustain the PC5-RRC sidelink connection.

In some examples, at 345, the first UE 115 or the second UE 115, or both, may increment the beam failure instance counter, and the beam failure instance counter may exceed the maximum beam failure instance counter value. If the beam failure instance counter exceeds or satisfies the maximum beam failure instance counter value, the first UE 115 or the second UE 115, or both, may initiate a BFR procedure at 350. If the beam failure instance counter does not exceed the maximum beam failure instance counter value, the UEs 115 may return to performing PCC beam measurements at 310.

At 355, the UEs 115 may initiate a PCC beam reselection procedure. If the PCC beam reselection procedure is successful, the first UE 115 may select a different beam of the PCC for communications, end the BFR procedure at 560, and return to normal operation at 305. If the PCC beam reselection procedure is unsuccessful, the UEs 115 may initiate a RACH recovery procedure at 360. If the RACH recovery procedure is successful, the UEs 115 may end the BFR procedure at 365 and return to normal operations at 305. If the RACH recovery procedure is unsuccessful, the UEs 115 may initiate the SCC to PCC cell change procedure.

In some cases, these procedures may be based on timers. For example, both UEs 115 in the sidelink connection may run timers associated with the BFD and BFR procedures. In some examples, the timers may be used to determine when to advance to a next stage in BFD or BFR, such as if a message transmitted by the one of the UEs 115 is missed or not received. In some examples, these timers may reduce the latency and delay in the BFD and BFR procedures, as if a UE 115 reports a timer expiration, the UEs 115 may transition to a next stage of BFD or BFR. For example, if one of the UEs 115 reports that a timer associated with the BFD procedures expires, the UEs 115 may transition to BFR procedures. Additionally, or alternatively, if a UE 115 reports an expiration of a timer associated with the BFR procedures, the UEs 115 may report RLF, at 340, which may prevent further delay and enable the UEs 115 to reestablish the sidelink connection at a faster rate. The timers at the UEs 115 associated with the BFD and BFR procedures are further described with reference to FIG. 4.

Figure 4:
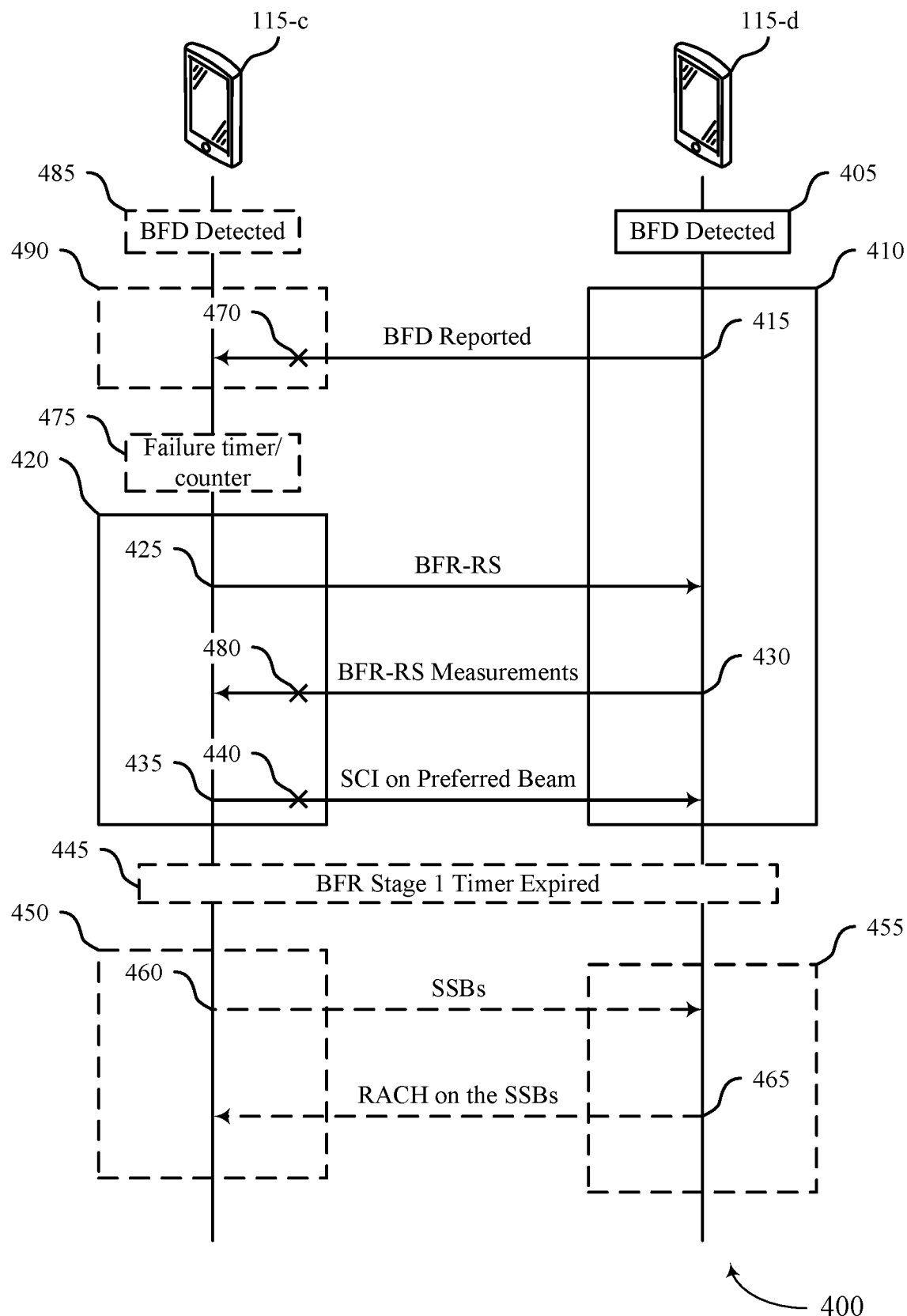
FIG. 4 illustrates an example of a process flow that supports techniques for primary sidelink carrier updating in sidelink carrier aggregation in accordance with one or more aspects of the present disclosure.

FIG. 4 illustrates an example of a process flow 400 that supports techniques for primary sidelink carrier updating in sidelink carrier aggregation in accordance with one or more aspects of the present disclosure. In some examples, the process flow 400 may implement aspects of the wireless communications system 100, the wireless communications system 200 or the flow diagram 300 or may be implemented by aspects of the of the wireless communications system 100, the wireless communications system 200 or the flow diagram 300. For example, the process flow 400 may include a UE 115-c and a UE 115-d, which may represent examples of corresponding devices described herein. In some cases, the process flow may describe a process of BFD and BFR procedures using sets of timers, such as the timers described with reference to FIG. 3

In the following description of the process flow 400, the operations between the UE 115-c and the UE 115-d may be performed in different orders or at different times. Some operations may also be left out of the process flow 400, or other operations may be added. Although the UE 115-c and the UE 115-d are shown performing the operations of the process flow 400, some aspects of some operations may also be performed by one or more other wireless devices.

The UE 115-c may transmit a first set of reference signals via a PCC of a sidelink carrier aggregation configuration and a second set of reference signals via one or more SCCs of the sidelink carrier aggregation configuration. At 405, the UE 115-d may detect a beam failure on a set of beams of the UE 115-c associated with the first set of reference signals via the PCC. In some cases, the UE 115-d may determine that a measurement of a reference signals associated with the set of beams of the UE 115-c is below a threshold indicating a beam failure. For example, a CSI measurement on a beam may be below a certain threshold. As such, a beam reselection may be triggered and a BFD procedure may be initiated.

At 410, the UE 115-d may initiate a BFR stage one receive timer for beam reselection procedures. The UE 115-d may use the BFR stage one receive timer to determine whether the UE 115-d has missed a message for the BFR procedure from the UE 115-c. In some cases, the UE 115-d may reset the BFR stage one receive timer each time a message has been received from the UE 115-c and may start the BFR stage one receive timer each time the UE 115-d transmits a message to the UE 115-c.

At 415, in some examples, the UE 115-c may receive, from the UE 115-d, a control message indicating the BFD for the PCC based on a quantity of beam failure instances satisfying a threshold. The UE 115-c may initiate a first timer (e.g., a stage one transmission timer) based on the control message indicating the BFD. In some cases, the quantity of beam failure instances may be greater than zero but also less than a maximum value of beam failure instances. In some other examples, if the UE 115-d indicates that the quantity of beam failure instances satisfy a threshold (e.g., above the maximum value of beam failure instances), the UEs 115 may initiate a BFR procedure described herein. In some examples, the control message indicating the BFD may be referred to as a BFD report.

At 420, the UE 115-c may initiate the first timer associated with BFD based on a BFD for the PCC. In some cases, the first timer may be referred to as a BFR stage one transmission timer. In some examples, the UE 115-c may initiate the BFR stage one transmission in response to the control message indicating the BFD report at 415. The UE 115-c may use the BFR stage one transmission timer to determine if the UE 115-c has missed a message from the UE 115-d. In some cases, the UE 115-d may reset the BFR stage one transmission timer each time a message has been received from the UE 115-d and may start the BFR stage one transmission timer each time the UE 115-c transmits a message to the UE 115-d.

At 425, the UE 115-c may transmit a set of BFR-RSs via one or more beams of the PCC while the first timer (e.g., the BFR stage one transmission timer) associated with BFD is active. In some cases, the BFR-RSs may be SSBs or CSI-RSs. In some examples, the UE 115-c may transmit the set of BFR-RSs via a subset of BFR-RSs from a set of BFR-RS resources.

At 430, the UE 115-d may perform measurements on the BFR-RSs and transmit the measurements to the UE 115-c. In some cases, the UE 115-d may also indicate if the measurements satisfy a BFR-RS threshold. In some examples, the UE 115-d may indicate a preferred beam or set of beams with the BFR-RS measurements. In some examples, based on the indication of the preferred beam or set of beams, the UEs 115 may perform a PCC beam switch or change procedure to the one or more preferred beams indicated by the UE 115-d. At, 435, the UE 115-c may transmit sidelink control information on the one or more preferred beams.

In some cases, at 440, the UE 115-d may miss or not receive the SCI on the preferred one or more beams. At 445, the BFR stage one receive timer may expire based on the UE 115-d missing the SCI from the UE 115-c. In some cases, in response to the BFR stage one receive timer expiring, the UEs 115 may initiate BFR procedures. In some other cases, the RSRP of all beams in a configured BFD-RS set may be below a certain threshold for a threshold quantity of measurements, and the UEs 115-c and the UE 115-d may initiate the BFR procedures described herein.

At 450, the UE 115-d may initiate a BFR stage two receive timer for RACH procedures. At 455, the UE 115-c may initiate a second timer (e.g., a BFR stage two transmission timer) associated with BFR. In some examples, the second timer (e.g., a HARQ-based timer or counter for BFR) may be a fraction of a maximum HARQ timer. In some examples, the second timer may be initiated based on the first timer expiring. For example, if the beam failure is resolved at the first stage (e.g., while the first timer is active), the UE 115-d may not initiate the second stage of beam recovery (e.g., initiating the second timer and procedures while the second timer is active). The BFR stage two receive timer and the BFR stage two transmission timer may operate similar to the BFR stage one receive timer and the BFR stage one transmission timer. However, upon expiration of one of the stage two timers, the UE 115-c or the UE 115-d, or both, may declare RLF.

At 460, the UE 115-c may transmit SSBs to the UE 115-d. At 470, the UEs 115 may perform a RACH procedure for the PCC while the second timer is active. The RACH procedure may be performed using the SSBs transmitted from the UE 115-c to the UE 115-d. For example, at 465, the UE 115-d may attempt to perform a RACH procedure using the SSBs transmitted at 460. In some cases, the RACH procedure may be unsuccessful, and the UE 115-c or the UE 115-d, or both, may declare RLF. Upon declaring RLF, the UEs 115 may drop the PC5-RRC connection and may attempt to reestablish the sidelink connection before resuming communications.

At 470, in some implementations, the control message or BFD report transmitted by the UE 115-d to the UE 115-c may be missed by the UE 115-c. As such, a failure timer or counter at the UE 115-c may expire at 475. When the failure timer or counter expires at the UE 115-c, the UE 115-c may initiate the first timer and perform BFR operations. For example, the UE 115-c may transmit beam sets of BFR-RSs to the UE 115-d.

In some examples, at 480, the UE 115-c may miss the BFR-RS measurements transmitted from the UE 115-d. If the UE 115-c does not receive the BFR-RS measurements, the BFR stage one transmission timer may expire at 445, and the UEs 115 may perform BFR procedures to prevent RLF.

In some examples, the UE 115-c and the UE 115-d may symmetrically detect BFD. For example, at 485, the UE 115-c may also detect a BFD (e.g., in addition to the UE 115-d detecting BFD). As the UE 115-c may expect to receive a control message or BFD report from the UE 115-d, the UE 115-c may initiate a BFR stage zero transmission timer at 490. If the UE 115-c does not receive a BFD report from the UE 115-d by the timer the BFR stage zero transmit timer expires, the UE 115-c may perform BFR procedures. For example, the UE 115-c may miss the BFD report at 470, and the BFR stage zero transmission timer may expire. After the BFR stage zero transmit timer expires, the UE 115-c may initiate the BFR stage one transmit timer and perform BFR procedures.

Figure 5:
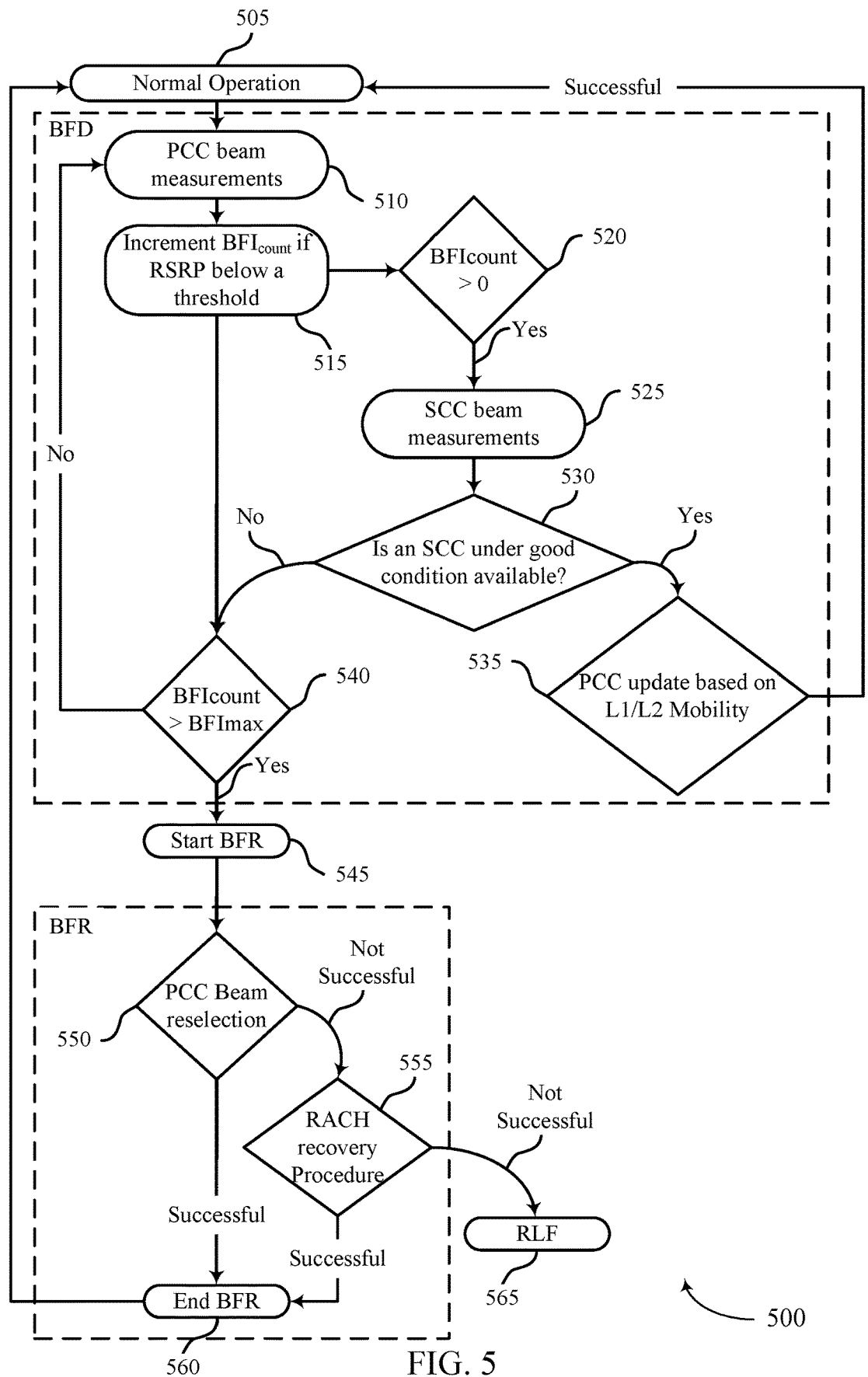
FIG. 5 illustrates an example of a flow diagram that supports techniques for primary sidelink carrier updating in sidelink carrier aggregation in accordance with one or more aspects of the present disclosure.

FIG. 5 illustrates an example of a flow diagram 500 that supports techniques for primary sidelink carrier updating in sidelink carrier aggregation in accordance with one or more aspects of the present disclosure. In some examples, the flow diagram 500 may implement or be implemented by the wireless communications system 100 or the wireless communications system 200. The flow diagram 500 may describe switching to a component carrier (e.g., based on L1/L2 mobility with preconfigured RRC configurations with MAC-CE activation commands) with reliable performance in frequency range 2 to prevent RLF. In such cases, a UE 115 may detect a strong interference in frequency range 1 (e.g., in a mode 2 mobility scenario) with L1/L2 mobility. The PCC and the SCCs may be examples of the PCC 205 and the SCCs 215 described with reference to FIG. 2. In some cases, the UEs 115 may be configured with a group of SCCs including one or more SCCs.

At 505, two UEs 115 in sidelink communications may perform normal operations on the PCC exchanging control signaling and data messages bi-directionally. A first UE 115 may transmit reference signals to a second UE 115, and the second UE 115 may detect that a reference signal transmitted from the first UE 115 is below a measurement threshold. As such, the first UE 115 or the second UE 115, or both, may trigger a beam reselection process and may initiate a BFD procedure. In some cases, as part of the BFD procedure the first UE 115 may transmit BFD-RSs (e.g., SSBs, CSI-RSs) to be measured by the second UE 115.

At 510, the UEs 115 may perform beam measurements on the BFD-RSs, which is described in more detail with reference to FIG. 3 (e.g., at 310 of FIG. 3). In some examples, a beam measurement of one of the BFD-RSs may be below the measurement threshold indicated and the UEs 115 may increment a beam failure instance counter, at 515. In some cases, at 520, the UEs 115 may detect the beam failure instance is above zero but below a maximum beam failure instance value. At 525, the UEs 115 may perform beam measurements on the SCCs. The UEs 115 may perform the SCC beam measurements to determine if an SCC can replace the PCC prior to the UEs 115 initiating a BFD procedure.

For example, at 525, the UEs 115 may detect that an SCC of the SCC group has higher quality than the PCC. In some examples, the UEs 115 may determine if the SCC is able to sustain the PC5-RRC sidelink channel between the UEs 115 at 530. If the UEs 115 determine that the SCC has high quality and can maintain the sidelink channel, the UEs 115 may initiate a PCC update and begin an SCC to PCC cell change procedure at 535. This procedure may provide increased efficiency, as the UEs 115 may not complete BFD procedures or perform BFR procedures. In some examples, the procedure to determine if an SCC can replace the PCC may occur during or prior to a BFD procedure (as illustrated).

However, if the UEs 115 determine the SCC is not in good condition or cannot maintain the sidelink channel, the UEs 115 may perform a BFD procedure. For example, the UEs 115 may perform additional PCC beam measurements and tracking additional instances of beam failure. In some examples, the UEs 115 may continue to check whether an SCC is available with high enough quality to replace the PCC.

The UEs 115 may continue monitoring the PCC until a beam failure instance count exceeds a beam failure instance maximum at 540. For example, when RSRP measurements of all beams in a configured BFD-RS set are below a configured measurement threshold for a threshold quantity of times, the UEs 115 may trigger a BFR procedure at 545.

At 550, the UEs 115 may initiate a PCC beam reselection procedure. If successful, the UEs 115 may select a different beam of the PCC for communications, end the BFR procedure at 560, and begin normal operations. In some cases, the UEs 115 may determine that the PCC beam reselection procedure is unsuccessful, and the UEs 115 may initiate a RACH recovery procedure at 555. If the UEs 115 determine that the RACH recovery procedure is unsuccessful, the first UE 115 may declare RLF at 565. Additionally, or alternatively, the UEs 115 may determine that the RACH recovery procedure is successful, and the UEs 115 may end the BFR procedure at 560, select a different PCC beam for communication, and return to normal operations.

In some examples, as described with reference to FIG. 3, the UEs 115 may have timers associated with the BFD and the BFR procedures. Further descriptions and uses for the timers for such procedures where the SCC to PCC cell change procedure may occur before or during the BFD procedure may be described elsewhere herein with reference to FIG. 6.

Figure 6:
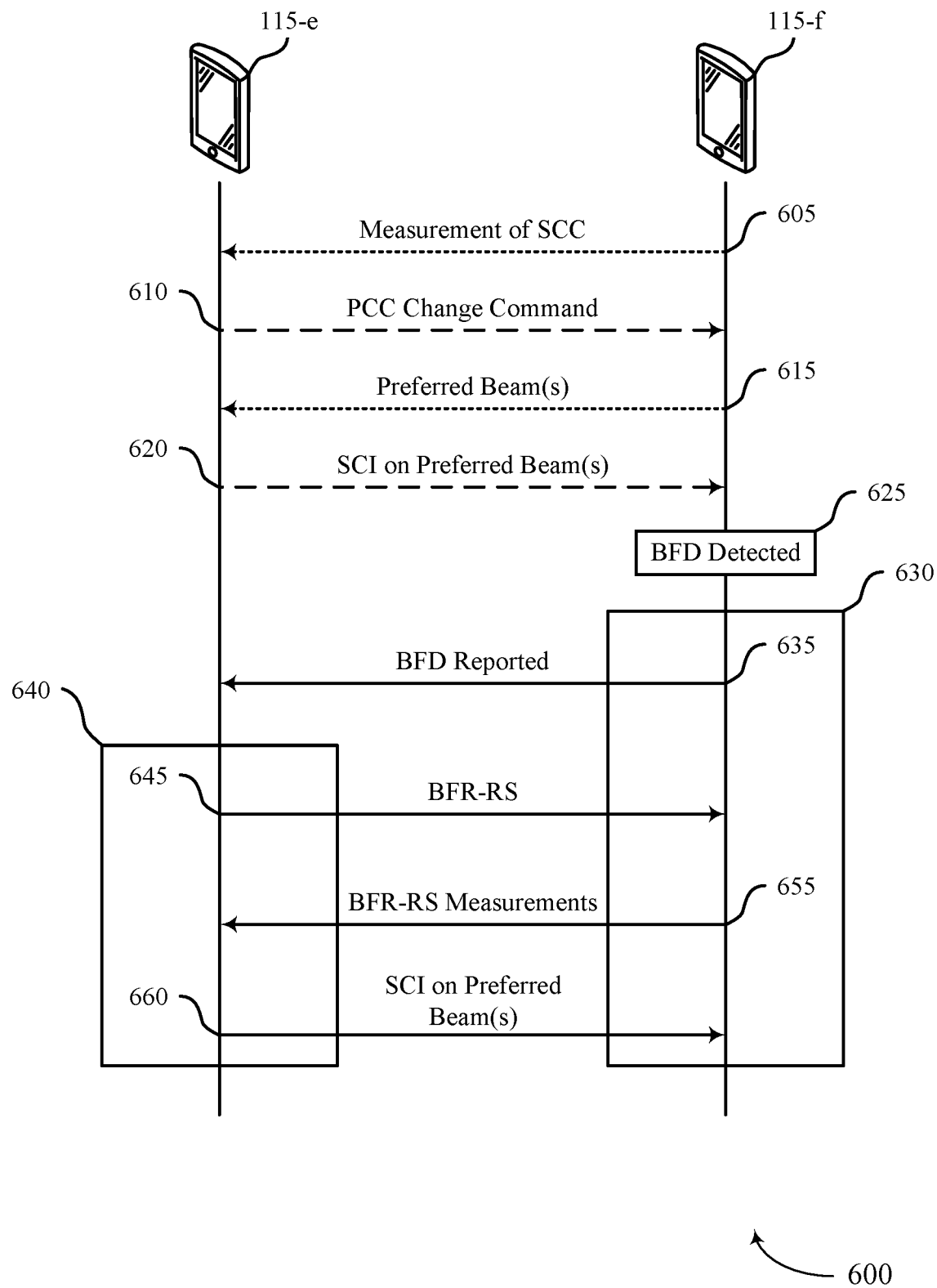
FIG. 6 illustrates an example of a process flow that supports techniques for primary sidelink carrier updating in sidelink carrier aggregation in accordance with one or more aspects of the present disclosure.

FIG. 6 illustrates an example of a process flow 600 that supports techniques for primary sidelink carrier updating in sidelink carrier aggregation in accordance with one or more aspects of the present disclosure.

In some examples, the process flow 600 may implement aspects of the wireless communications system 100, the wireless communications system 200, or the flow diagram 500, or the process flow 600 may be implemented by aspects of the of the wireless communications system 100 or the wireless communications system 200. For example, the process flow 600 may include a UE 115-e and a UE 115-f, which may represent examples of corresponding devices described herein. In some cases, the process flow may describe a process of BFD and BFR procedures using sets (e.g., such as the timers described with reference to FIG. 3-5) of timers and performing an SCC to PCC cell change procedure before or during the BFD procedure.

In the following description of the process flow 600, the operations between the UE 115-e and the UE 115-f may be performed in different orders or at different times. Some operations may also be left out of the process flow 600, or other operations may be added. Although the UE 115-e and the UE 115-f are shown performing the operations of the process flow 600, some aspects of some operations may also be performed by one or more other wireless devices.

The UE 115-e may transmit a first set of reference signals via a PCC of a sidelink carrier aggregation and a second set of reference signals via one or more SCCs of the sidelink carrier aggregation configurations. At 605, the UE 115-e may receive a measurement message indicating measurements for a set of beams corresponding to an SCC of the sidelink carrier aggregation configuration based on detection of a beam failure instance for the PCC. For example, the UE 115-f may detect a beam failure instance for one or more beams of the PCC and transmit a measurement report indicating measurements of beams of one or more SCCs. In some cases, the UE 115-f may determine that the measurements for the set of beams corresponding to the SCC satisfy a threshold associated with sustaining an RRC control link of the PCC (e.g., such as the PC5-RRC control link). In some examples, the measurement message may be received based on a quantity of beam failure instances satisfying a threshold.

At 610, the UE 115-e may transmit, via L1 signaling or L2 signaling, a control message indicating to switch the primary sidelink carrier to the set of beams based on the measurement for the set of beams and the beam failure instance for the primary sidelink carrier. In some examples, SCI or a MAC message may be an example of the L1 signaling or the L2 signaling. In some examples, switching the PCC to the set of beams corresponding to the SCC may be based on the set of beams corresponding to the SCC sustaining an RRC control link of the PCC. For example, based on the measurements, the SCC may support maintaining an RRC link of the PCC. As such, in some cases, the UE 115-e may transmit the control message based on the set of beams satisfying the threshold to sustain the RRC control link of the PCC. In some other examples, the control message may be transmitted based on the measurements of the set of beams corresponding to the SCC being higher than the measurements for a second set of beams corresponding to the PCC. In such cases, the control message may be transmitted prior to the BFD procedure based on the beam failure instance.

At 615, the UE 115-f may transmit an indication of preferred beam of the set of beams corresponding to the SCC. In some cases, the UE 115-f may transmit an indication of a set of preferred beams which may be a subset of the set of beams corresponding to the SCC. In some cases, the UE 115-e may transmit an SCI via the preferred beam(s) at 620 based on switching the PCC to the set of beams. After 615, the PCC may be switched to a previous SCC, or the beams of the PCC may be changed to beams of a previous SCC which could support maintaining the RRC link or had higher quality than the previous PCC.

In some examples, the UE 115-f may detect a beam failure on a set of beams of the UE 115-e associated with the first set of reference signals via the PCC at 625. For example, if the PCC beam change is unsuccessful, or quality of the new PCC degrades, the UE 115-f may detect a beam failure. In some cases, the UE 115-f may determine that a measurement of a reference signals associated with the set of beams of the UE 115-e may be below a threshold indicating a beam failure. As such, the UE 115-f may initiate a BFR stage one receive timer at 630, which is described in greater detail with reference to FIG. 4 (e.g., 410 of FIG. 4).

At 635, the UE 115-e may receive, from the UE 115-f, a second control message (e.g., a BFD report) indicating a BFD. In some cases, at 640, the UE 115-e may initiate a first BFR timer (e.g., a BFR stage one transmission timer) based at on the BFD report. In some cases, the first BFR timer may be associated with beam reselection.

In some examples, the UE 115-e and the UE 115-f may initiate a BFD procedure based on the beam failure instance. For example, at 645, the UE 115-e may transmit BFR-RSs for the UE 115-f to measure. At 655 the UE 115-f may transmit the BFR-RS measurements, indicating a preferred one or more beams. At 660, the UE 115-e may transmit an SCI message on the indicated preferred one or more beams to the UE 115-f.

Additionally, or alternatively, if the beam reselection in the BFD procedure is unsuccessful, the UE 115-e and the UE 115-f may perform a BFR procedure. If the BFR procedure is unsuccessful, the UE 115-e may declare RLF. The BFR procedure may be described with reference to FIG. 4.

Figure 7:
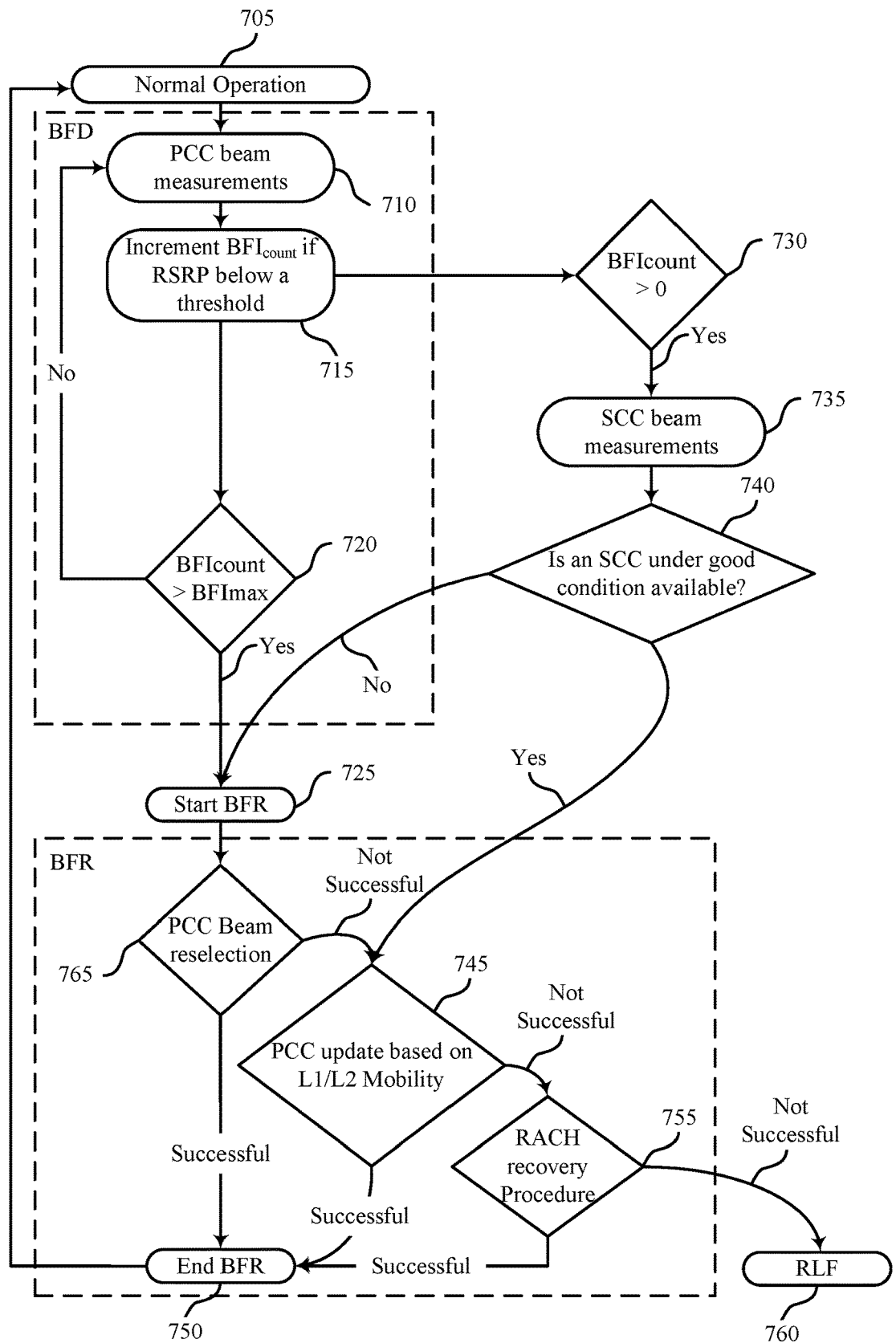
FIG. 7 illustrates an example of a flow diagram that supports techniques for primary sidelink carrier updating in sidelink carrier aggregation in accordance with one or more aspects of the present disclosure.

FIG. 7 illustrates an example of a flow diagram 700 that supports techniques for primary sidelink carrier updating in sidelink carrier aggregation in accordance with one or more aspects of the present disclosure. In some examples, the flow diagram 700 may implement or be implemented by the wireless communications system 100 or the wireless communications system 200. The flow diagram 700 may describe switching to a component carrier (e.g., based on L1/L2 mobility with preconfigured RRC configurations with MAC-CE activation commands) with reliable performance (e.g., in frequency range 1 after BFR has not been successful) before performing a RACH procedure. The PCC and the SCCs may be examples of the PCC 205 and the SCCs 215 described with reference to FIG. 2.

At 705, two UEs 115 in sidelink communications may perform normal operations on the PCC exchanging control signaling and data messages bi-directionally. However, in some cases, a beam reselection process may be triggered and the UEs 115 may initiate a BFD procedure.

At 710, the UEs 115 may perform PCC beam measurements on the BFD-RSs. In some examples, an RSRP of the beam measurement of one of the BFR-RSs may be below a measurement threshold, and the UEs 115 may increment a beam failure instance counter at 715. At 720, the UEs 115 may increment the beam failure instance counter, and check whether the beam failure instance counter has exceeded the maximum beam failure instance counter value at 720. If the beam failure instance counter has not exceeded the maximum beam failure instance counter value, the UEs 115 may return to performing PCC beam measurements. If the quantity of beam failure instances does satisfy, or exceed, the maximum beam failure instance counter value, the UEs 115 may initiate a BFR procedure at 725.

At 730, a quantity of beam failure instances is above zero but below the maximum beam failure instance value, and the UEs 115 may perform SCC beam measurements at 735. At 740, the UEs 115 may compare the measurements of the SCCs in the SCC group to determine if an SCC can support replacing the current PCC. If the UEs 115 determine that no SCCs have high enough quality to replace the PCC, the UEs 115 may start a BFR procedure at 725. If the UEs 115 determine that an SCC is in good condition (e.g., the SCC may sustain the PC5-RRC sidelink channel), the UEs 115 may initiate a PCC update based on L1/L2 mobility and begin an SCC to PCC cell change procedure at 745. The UEs 115 may perform the PCC update procedure to update the PCC to an SCC which can support the sidelink channel without performing the entire BFR procedure. If the PCC update procedure is successful, the UEs 115 may switch to communicating using the selected SCC, end BFR procedures at 750, and begin normal operations again.

However, if the PCC update procedure is not successful, the UEs 115 may perform a RACH recovery procedure at 755. In some cases, the RACH procedures may not be successful and the UEs 115 may report RLF at 760.

If no SCC can support the sidelink or is in good condition, and the BFR procedure is initiated, the UEs 115 may begin PCC beam reselection at 765. If the PCC beam reselection is successful, the UEs 115 may end the BFR procedure at 750 and resume normal operations. If the PCC beam reselection procedure is unsuccessful, the UEs 115 may initiate the PCC update procedure prior to performing a RACH procedure.

In some examples, as described with reference to FIG. 3, the UEs 115 may have timers associated with the BFD and the BFR procedures. Further descriptions and uses for the timers for such procedures where the SCC to PCC cell change procedure may occur before or during the BFR procedure may be described with reference to FIG. 8.

Figure 8:
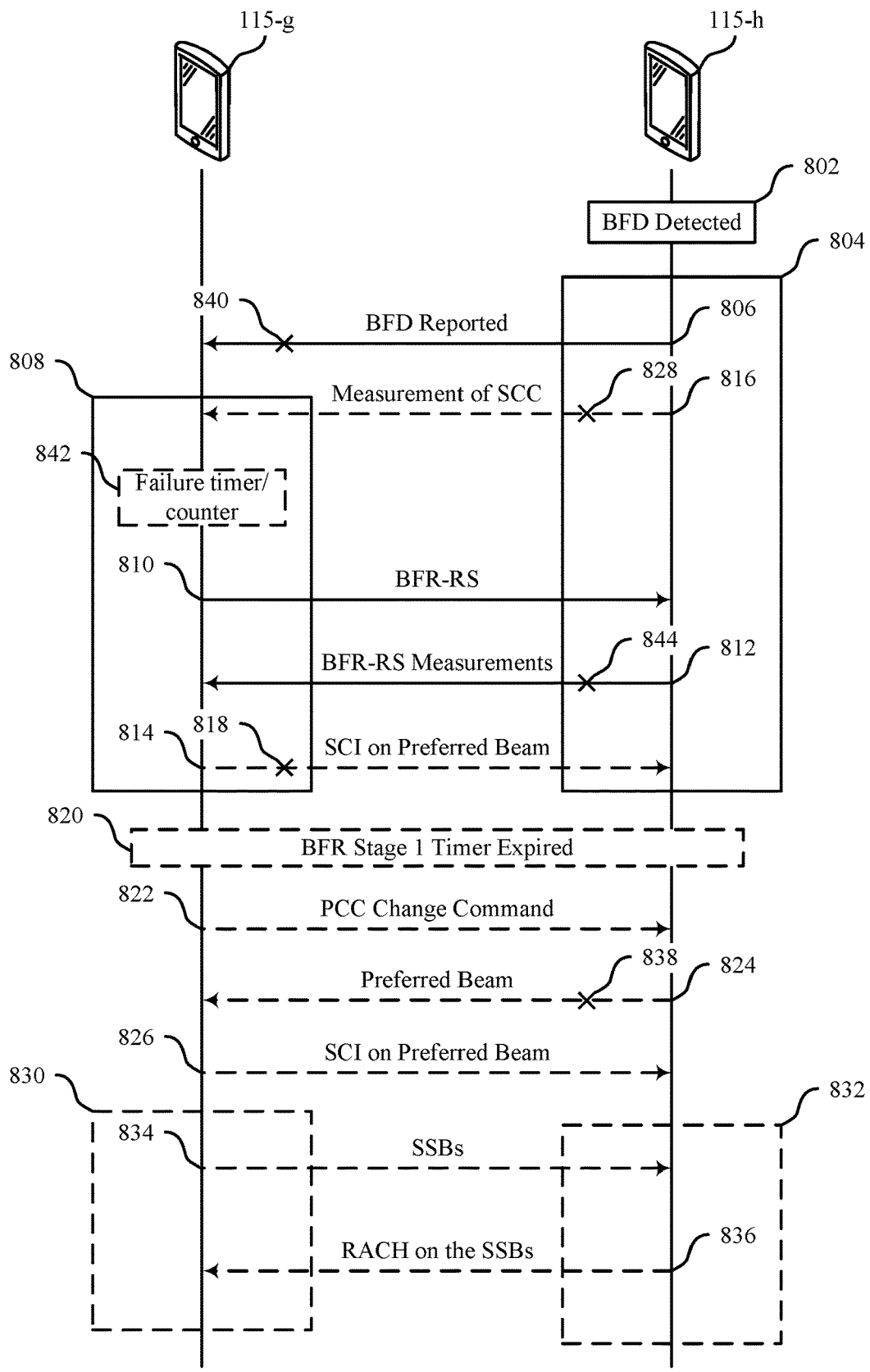
FIG. 8 illustrates an example of a process flow that supports techniques for primary sidelink carrier updating in sidelink carrier aggregation in accordance with one or more aspects of the present disclosure.

FIG. 8 illustrates an example of a process flow 800 that supports techniques for primary sidelink carrier updating in sidelink carrier aggregation in accordance with one or more aspects of the present disclosure.

In some examples, the process flow 800 may implement aspects of the wireless communications system 100, the wireless communications system 200, or the flow diagram 700, or the process flow 800 may be implemented by aspects of the of the wireless communications system 100, the wireless communications system 200, or the flow diagram 700. For example, the process flow 800 may include a UE 115-g and a UE 115-h, which may represent examples of corresponding devices described herein. In some cases, the process flow may describe a process of BFD and BFR procedures using sets of timers (e.g., the timers described with reference to FIG. 3-7) and performing an SCC to PCC cell change procedure before or during the BFR procedure.

In the following description of the process flow 800, the operations between the UE 115-g and the UE 115-h may be performed in different orders or at different times. Some operations may also be left out of the process flow 800, or other operations may be added. Although the UE 115-g and the UE 115-h are shown performing the operations of the process flow 800, some aspects of some operations may also be performed by one or more other wireless devices.

The UE 115-g may transmit a first set of reference signals via a PCC of a sidelink carrier aggregation and a second set of reference signals via one or more SCCs of the sidelink carrier aggregation configurations. At 802, the UE 115-h may detect a beam failure on a set of beams of the UE 115-g associated with the first set of reference signals via the PCC. In some cases, the UE 115-h may determine that a measurement of a reference signals associated with the set of beams of the UE 115-g is below a threshold indicating a beam failure. The UE 115-h may initiate a BFR stage one receive timer at 804, which may be described in greater detail with reference to FIG. 4 (e.g., at 410 of FIG. 4).

At 806, the UE 115-g may receive, from the UE 115-h, a BFD report indicating beam failure. In some cases the UE 115-g may initiate a first BFR timer (e.g., a BFR stage one transmission timer) at 808 based on the reported beam failure instance. In some cases, the first BFR time may be associated with beam reselection.

In some examples, the UE 115-g and the UE 115-h may initiate a BFD procedure based on the beam failure instance. For example, at 810, the UE 115-g may transmit a set of BFR-RSs for the UE 115-h to measure. The UE 115-h may measure the BFR-RSs transmitted by the UE 115-g and, at 812, the UE 115-h may transmit a measurement report indicating measurements for the BFR-RS and a preferred one or more beams based on the measurements. At 814, the UE 115-g may transmit an SCI message on the preferred one or more beams to the UE 115-h.

In some examples, the UE 115-h may receive a measurement message indicating measurements for a set of beams corresponding to an SCC of the sidelink carrier aggregation configuration based on a beam failure instance for the PCC. In some cases, at 818, the UE 115-h may miss or not receive the SCI from the UE 115-g. At 820, the BFR stage one receive timer may expire, and the UE 115-g and the UE 115-h may initiate BFR procedures based on the BFR stage one timer expiring. Prior to the BFR procedures, in some implementations the UE 115-g and the UE 115-h may attempt a PCC update, before completing the BFR procedures as a RACH procedure may be delay intensive.

In some cases, the UE 115-h may determine that the measurements for the set of beams corresponding to the SCC satisfy a threshold associated with sustaining an RRC control link of the PCC (e.g., such as the PC5-RRC control link). In some examples, the measurement message at 816 may be received based on a quantity of beam failure instances satisfying a threshold. At 822, the UE 115-g may transmit, via L1 signaling or L2 signaling, a control message indicating to switch the primary sidelink carrier to one or more beams indicated by the measurement message based on measurements for the one or more beams and the beam failure instance for the primary sidelink carrier (e.g., the PCC update). In some examples, switching the PCC to the set of beams corresponding to the SCC may be based on the set of beams corresponding to the SCC sustaining an RRC control link of the PCC. As such, in some cases, the UE 115-g may transmit the control message at 822 based on the set of beams satisfying the threshold to sustain the RRC control link of the PCC.

In some other examples, the UE 115-g may transmit the control message based on the measurements of the set of beams corresponding to the SCC being higher than the measurements for a second set of beams corresponding to the PCC. For example, UE 115-g may transmit the control message prior to the BFR procedure based on detection of the beam failure instance. In some other cases, the control message may be transmitted based on the expiration of the first BFR timer at 820.

At 824, the UE 115-h may indicate a preferred beam of the set of beams corresponding to the SCC to the UE 115-g. In some cases, the UE 115-h may transmit a set of preferred beams which may be a subset of the set of beams corresponding to the SCC. At 826, the UE 115-g may transmit, to the UE 115-h, an SCI via the indicated preferred beam based on switching the PCC to the set of beams. In some cases, this PCC beam switch procedure may be performed prior to or during BFR procedures, such as before a RACH procedure.

However, in some cases, the PCC update procedure (e.g., at 822-826) may not be successful, there may not be a reliable SCC, or a beam failure instance counter may exceed a maximum value, and the UE 115-g may trigger a BFR procedure (e.g., steps 830-832). Additionally, or alternatively, at 828, the UE 115-g may miss the measurement message, or the UE 115-g may not receive the indication of the preferred beam at 838. If the UE 115-g misses the measurement message, the first BFR timer may expire at 820, and the UE 115-g may initiate a second BFR timer (e.g., a BFR stage two transmission timer) associated with performing a RACH procedure for the PCC at 830. In some examples, at 832, the UE 115-h may also initiate a second BFR timer (e.g., a BFR stage two receive timer) associated with performing the RACH procedure. In some cases, the control message transmitted by the UE 115-g at 822 may be transmitted during the BFR procedure, following the UE 115-g and the UE 115-h initiating the second BFR timers.

At 834, the UE 115-g may transmit SSBs to the UE 115-h. At 836, the UE 115-g and the UE 115-h may perform a RACH procedure for the PCC while the second BFR time may be active. The RACH procedure performed may be on or using the SSBs transmitted from the UE 115-g to the UE 115-h, at 836. In some cases, the RACH procedure may be unsuccessful and the UE 115-g may declare RLF. Upon declaring RLF, the UEs 115 may drop the PC5-RRC connection and may attempt to reestablish the sidelink connection before resuming communications. In some examples, the BFR procedures may be initiated instead of performing the PCC update.

At 840, in some implementations, the control message or BFD report transmitted by the UE 115-h to the UE 115-g may be missed by the UE 115-g. The UE 115-g may detect a failure timer has expired or a failure counter satisfies a threshold at 842. The failure timer or counter may be a HARQ based timer or counter and may be a fraction of a maximum HARQ timer. Additionally, or alternatively, at 844, the UE 115-c may miss the BFR-RS measurements from the UE 115-h. If the UE 115-g misses the BFR-RS measurements, the stage one transmission timer may expire at 820, and the UEs 115 may perform a BFR procedure to prevent RLF. If the BFR procedures fail, including the PCC update procedure and the RACH procedure, the UE 115-g may declare RLF, drop the sidelink channel, and may attempt to reestablish the connection.

Figure 9:
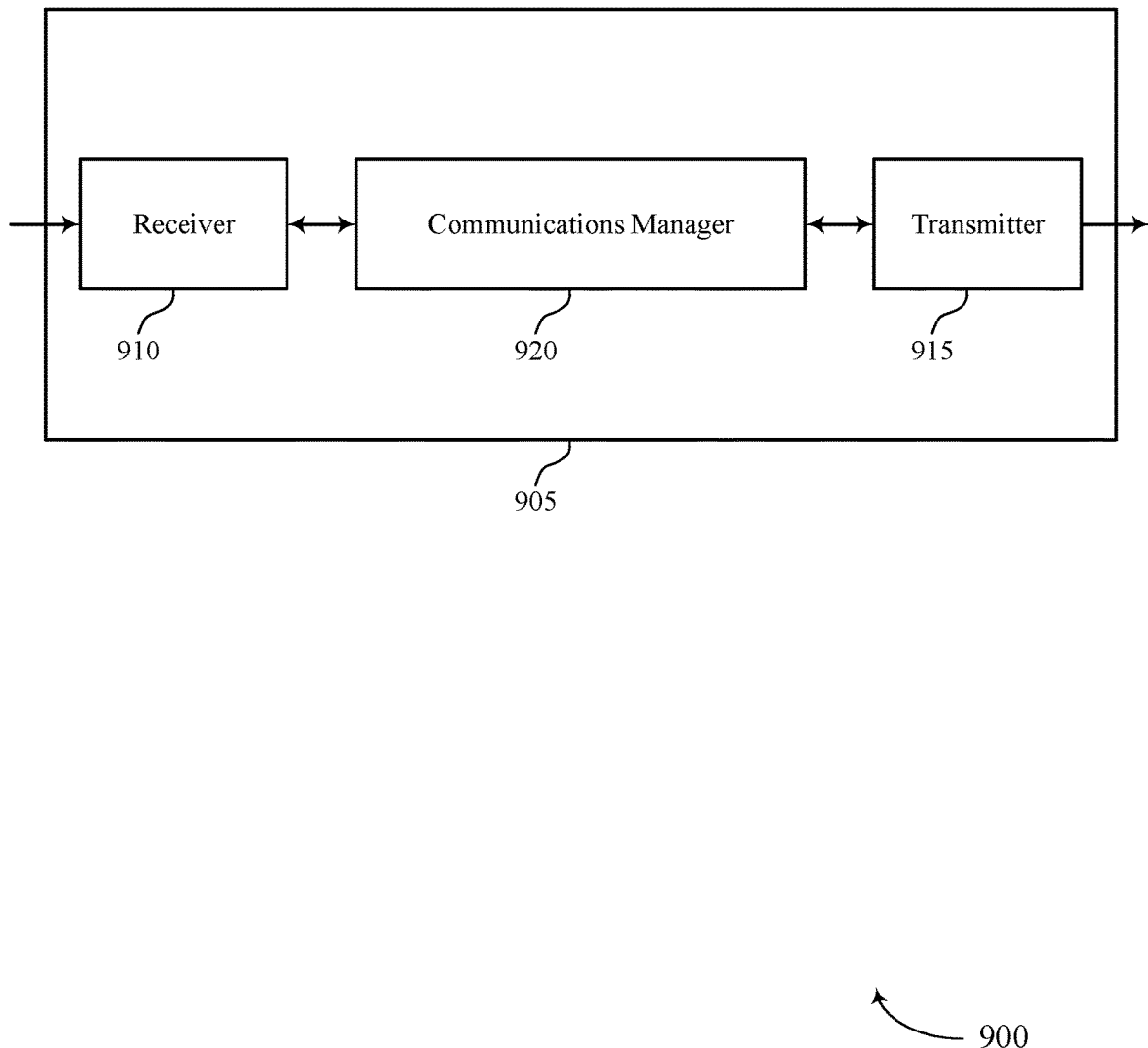
FIGS. 9 and 10 illustrate block diagrams of devices that support techniques for primary sidelink carrier updating in sidelink carrier aggregation in accordance with one or more aspects of the present disclosure.

FIG. 9 illustrates a block diagram 900 of a device 905 that supports techniques for primary sidelink carrier updating in sidelink carrier aggregation in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for primary sidelink carrier updating in sidelink carrier aggregation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for primary sidelink carrier updating in sidelink carrier aggregation). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for primary sidelink carrier updating in sidelink carrier aggregation as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a first UE in accordance with examples as disclosed herein. For example, the communications manager 920 may be configured as or otherwise support a means for transmitting a first set of reference signals via a primary sidelink carrier of a sidelink carrier aggregation configuration and a second set of reference signals via one or more secondary sidelink carriers of the sidelink carrier aggregation configuration. The communications manager 920 may be configured as or otherwise support a means for receiving, based on the first set of reference signals and the second set of reference signals, a measurement message indicating measurements for a set of beams corresponding to a secondary sidelink carrier of the sidelink carrier aggregation configuration based on a beam failure instance for the primary sidelink carrier. The communications manager 920 may be configured as or otherwise support a means for transmitting, via Layer 1 signaling or Layer 2 signaling, a control message indicating to switch the primary sidelink carrier to the set of beams based on the measurements for the set of beams and the beam failure instance for the primary sidelink carrier.

Additionally, or alternatively, the communications manager 920 may support wireless communications at a first UE in accordance with examples as disclosed herein. For example, the communications manager 920 may be configured as or otherwise support a means for transmitting a first set of reference signals via a primary sidelink carrier of a sidelink carrier aggregation configuration and a second set of reference signals via one or more secondary sidelink carriers of the sidelink carrier aggregation configuration. The communications manager 920 may be configured as or otherwise support a means for initiating a first timer associated with beam failure recovery based on a beam failure detection for the primary sidelink carrier. The communications manager 920 may be configured as or otherwise support a means for transmitting a set of beam failure recovery reference signals via one or more beams of the primary sidelink carrier while the first timer associated with beam failure recovery is active.

Additionally, or alternatively, the communications manager 920 may support wireless communications at a second UE in accordance with examples as disclosed herein. For example, the communications manager 920 may be configured as or otherwise support a means for receiving a first set of reference signals via a primary sidelink carrier of a sidelink carrier aggregation configuration and a second set of reference signals via one or more secondary sidelink carriers of the sidelink carrier aggregation configuration. The communications manager 920 may be configured as or otherwise support a means for transmitting, based on the first set of reference signals and the second set of reference signals, a measurement message indicating measurements for a set of beams corresponding to a secondary sidelink carrier of the sidelink carrier aggregation configuration based on a beam failure instance for the primary sidelink carrier. The communications manager 920 may be configured as or otherwise support a means for receiving, via Layer 1 signaling or Layer 2 signaling, a control message indicating to switch the primary sidelink carrier to the set of beams based on the measurements for the set of beams and the beam failure instance for the primary sidelink carrier.

Additionally, or alternatively, the communications manager 920 may support wireless communications at a second UE in accordance with examples as disclosed herein. For example, the communications manager 920 may be configured as or otherwise support a means for receiving a first set of reference signals via a primary sidelink carrier of a sidelink carrier aggregation configuration and a second set of reference signals via one or more secondary sidelink carriers of the sidelink carrier aggregation configuration. The communications manager 920 may be configured as or otherwise support a means for initiating a first timer associated with beam failure recovery based on a beam failure detection for the primary sidelink carrier. The communications manager 920 may be configured as or otherwise support a means for monitoring for a set of beam failure recovery reference signals via one or more beams of the primary sidelink carrier while the first timer associated with beam failure recovery is active.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing and reduced power consumption by preventing power-intensive procedures such as a random access procedure or beam failure recovery.

Figure 10:
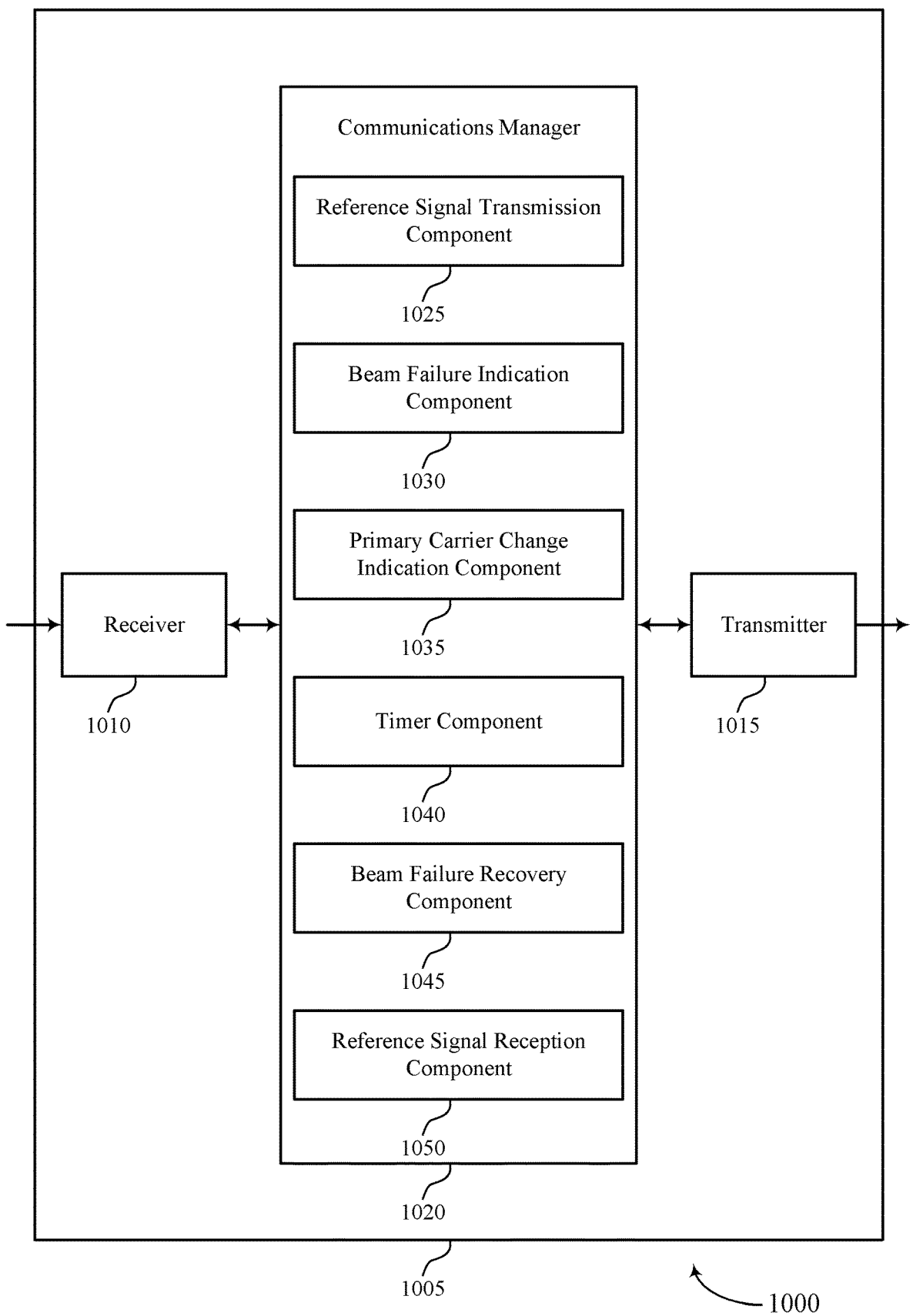

FIG. 10 illustrates a block diagram 1000 of a device 1005 that supports techniques for primary sidelink carrier updating in sidelink carrier aggregation in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for primary sidelink carrier updating in sidelink carrier aggregation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for primary sidelink carrier updating in sidelink carrier aggregation). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for primary sidelink carrier updating in sidelink carrier aggregation as described herein. For example, the communications manager 1020 may include a reference signal transmission component 1025, a beam failure indication component 1030, a primary carrier change indication component 1035, a timer component 1040, a beam failure recovery component 1045, a reference signal reception component 1050, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a first UE in accordance with examples as disclosed herein. The reference signal transmission component 1025 may be configured as or otherwise support a means for transmitting a first set of reference signals via a primary sidelink carrier of a sidelink carrier aggregation configuration and a second set of reference signals via one or more secondary sidelink carriers of the sidelink carrier aggregation configuration. The beam failure indication component 1030 may be configured as or otherwise support a means for receiving, based on the first set of reference signals and the second set of reference signals, a measurement message indicating measurements for a set of beams corresponding to a secondary sidelink carrier of the sidelink carrier aggregation configuration based on a beam failure instance for the primary sidelink carrier. The primary carrier change indication component 1035 may be configured as or otherwise support a means for transmitting, via Layer 1 signaling or Layer 2 signaling, a control message indicating to switch the primary sidelink carrier to the set of beams based on the measurements for the set of beams and the beam failure instance for the primary sidelink carrier.

Additionally, or alternatively, the communications manager 1020 may support wireless communications at a first UE in accordance with examples as disclosed herein. The reference signal transmission component 1025 may be configured as or otherwise support a means for transmitting a first set of reference signals via a primary sidelink carrier of a sidelink carrier aggregation configuration and a second set of reference signals via one or more secondary sidelink carriers of the sidelink carrier aggregation configuration. The timer component 1040 may be configured as or otherwise support a means for initiating a first timer associated with beam failure recovery based on a beam failure detection for the primary sidelink carrier. The beam failure recovery component 1045 may be configured as or otherwise support a means for transmitting a set of beam failure recovery reference signals via one or more beams of the primary sidelink carrier while the first timer associated with beam failure recovery is active.

Additionally, or alternatively, the communications manager 1020 may support wireless communications at a second UE in accordance with examples as disclosed herein. The reference signal reception component 1050 may be configured as or otherwise support a means for receiving a first set of reference signals via a primary sidelink carrier of a sidelink carrier aggregation configuration and a second set of reference signals via one or more secondary sidelink carriers of the sidelink carrier aggregation configuration. The beam failure indication component 1030 may be configured as or otherwise support a means for transmitting, based on the first set of reference signals and the second set of reference signals, a measurement message indicating measurements for a set of beams corresponding to a secondary sidelink carrier of the sidelink carrier aggregation configuration based on a beam failure instance for the primary sidelink carrier. The primary carrier change indication component 1035 may be configured as or otherwise support a means for receiving, via Layer 1 signaling or Layer 2 signaling, a control message indicating to switch the primary sidelink carrier to the set of beams based on the measurements for the set of beams and the beam failure instance for the primary sidelink carrier.

Additionally, or alternatively, the communications manager 1020 may support wireless communications at a second UE in accordance with examples as disclosed herein. The reference signal reception component 1050 may be configured as or otherwise support a means for receiving a first set of reference signals via a primary sidelink carrier of a sidelink carrier aggregation configuration and a second set of reference signals via one or more secondary sidelink carriers of the sidelink carrier aggregation configuration.

The timer component 1040 may be configured as or otherwise support a means for initiating a first timer associated with beam failure recovery based on a beam failure detection for the primary sidelink carrier. The beam failure recovery component 1045 may be configured as or otherwise support a means for monitoring for a set of beam failure recovery reference signals via one or more beams of the primary sidelink carrier while the first timer associated with beam failure recovery is active.

Figure 11:
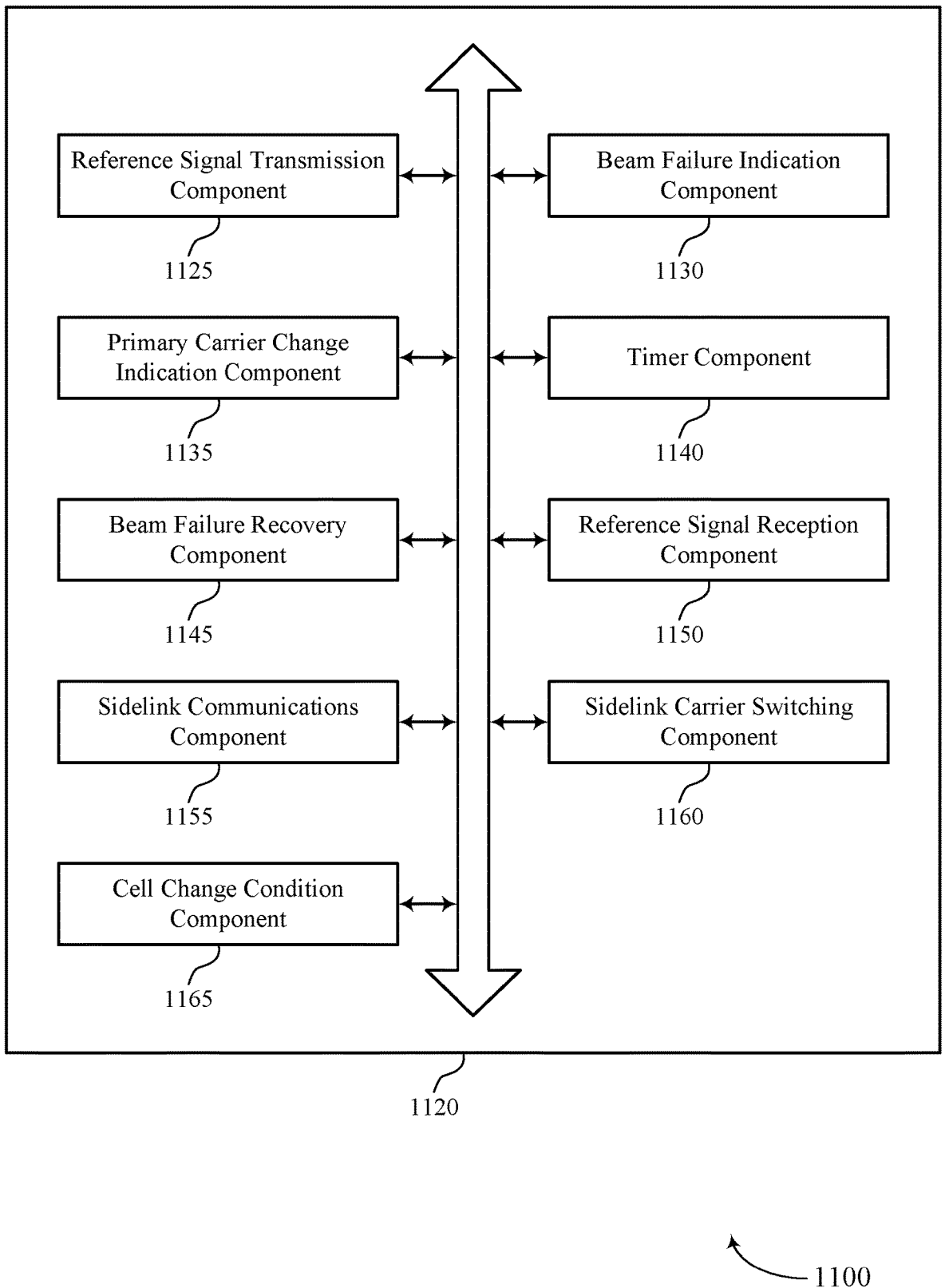
FIG. 11 illustrates a block diagram of a communications manager that supports techniques for primary sidelink carrier updating in sidelink carrier aggregation in accordance with one or more aspects of the present disclosure.

FIG. 11 illustrates a block diagram 1100 of a communications manager 1120 that supports techniques for primary sidelink carrier updating in sidelink carrier aggregation in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for primary sidelink carrier updating in sidelink carrier aggregation as described herein. For example, the communications manager 1120 may include a reference signal transmission component 1125, a beam failure indication component 1130, a primary carrier change indication component 1135, a timer component 1140, a beam failure recovery component 1145, a reference signal reception component 1150, a sidelink communications component 1155, a sidelink carrier switching component 1160, a cell change condition component 1165, or any combination thereof. Each of these components may communicate, directly or indirectly, with one another (e.g., via one or more buses).

The communications manager 1120 may support wireless communications at a first UE in accordance with examples as disclosed herein. The reference signal transmission component 1125 may be configured as or otherwise support a means for transmitting a first set of reference signals via a primary sidelink carrier of a sidelink carrier aggregation configuration and a second set of reference signals via one or more secondary sidelink carriers of the sidelink carrier aggregation configuration. The beam failure indication component 1130 may be configured as or otherwise support a means for receiving, based on the first set of reference signals and the second set of reference signals, a measurement message indicating measurements for a set of beams corresponding to a secondary sidelink carrier of the sidelink carrier aggregation configuration based on a beam failure instance for the primary sidelink carrier. The primary carrier change indication component 1135 may be configured as or otherwise support a means for transmitting, via Layer 1 signaling or Layer 2 signaling, a control message indicating to switch the primary sidelink carrier to the set of beams based on the measurements for the set of beams and the beam failure instance for the primary sidelink carrier.

In some examples, the sidelink communications component 1155 may be configured as or otherwise support a means for transmitting sidelink control information via the set of beams based on switching the primary sidelink carrier to the set of beams.

In some examples, the sidelink carrier switching component 1160 may be configured as or otherwise support a means for switching the primary sidelink carrier to the set of beams corresponding to the secondary sidelink carrier based on the set of beams corresponding to the secondary sidelink carrier sustaining a radio resource control link of the primary sidelink carrier.

In some examples, the cell change condition component 1165 may be configured as or otherwise support a means for determining the measurements for the set of beams corresponding to the secondary sidelink carrier satisfy a threshold associated with sustaining a radio resource control link of the primary sidelink carrier, where transmitting the control message is based on the measurements for the set of beams satisfying the threshold.

In some examples, the control message is transmitted based on the measurements for the set of beams corresponding to the secondary sidelink carrier being higher than measurements for a second set of beams corresponding to the primary sidelink carrier.

In some examples, the control message is transmitted prior to a beam failure detection procedure based on the beam failure instance.

In some examples, the primary carrier change indication component 1135 may be configured as or otherwise support a means for initiating a beam failure detection procedure based on the beam failure instance, where the control message is transmitted during the beam failure detection procedure.

In some examples, the primary carrier change indication component 1135 may be configured as or otherwise support a means for initiating a beam failure recovery procedure based on a quantity of beam failure instances satisfying a threshold, where the control message is transmitted during the beam failure recovery procedure.

In some examples, the measurement message is received based on a quantity of beam failure instances satisfying a threshold.

In some examples, the timer component 1140 may be configured as or otherwise support a means for receiving a second control message indicating a beam failure detection. In some examples, the timer component 1140 may be configured as or otherwise support a means for initiating a first beam failure recovery timer based on the beam failure detection.

In some examples, the timer component 1140 may be configured as or otherwise support a means for detecting an expiration of the first beam failure recovery timer, where transmitting the control message is based on the expiration of the first beam failure recovery timer.

In some examples, the first beam failure recovery timer is associated with beam reselection.

In some examples, the timer component 1140 may be configured as or otherwise support a means for detecting an expiration of the first beam failure recovery timer. In some examples, the timer component 1140 may be configured as or otherwise support a means for initiating a second beam failure recovery timer associated with performing a random access procedure for the primary sidelink carrier.

In some examples, the primary sidelink carrier corresponds to a first frequency range, and the secondary sidelink carrier corresponds to a second frequency range.

In some examples, the primary sidelink carrier corresponds to a first radio frequency spectrum band in a radio frequency range and the secondary sidelink carrier corresponds to a second radio frequency spectrum band in the radio frequency range.

In some examples, the primary sidelink carrier and the secondary sidelink carrier correspond to a same radio frequency spectrum band.

Additionally, or alternatively, the communications manager 1120 may support wireless communications at a first UE in accordance with examples as disclosed herein. In some examples, the reference signal transmission component 1125 may be configured as or otherwise support a means for transmitting a first set of reference signals via a primary sidelink carrier of a sidelink carrier aggregation configuration and a second set of reference signals via one or more secondary sidelink carriers of the sidelink carrier aggregation configuration. The timer component 1140 may be configured as or otherwise support a means for initiating a first timer associated with beam failure recovery based on a beam failure detection for the primary sidelink carrier. The beam failure recovery component 1145 may be configured as or otherwise support a means for transmitting a set of beam failure recovery reference signals via one or more beams of the primary sidelink carrier while the first timer associated with beam failure recovery is active.

In some examples, the timer component 1140 may be configured as or otherwise support a means for initiating a second timer associated with beam failure recovery based on an expiration of the first timer. In some examples, the beam failure recovery component 1145 may be configured as or otherwise support a means for performing a random access procedure for the primary sidelink carrier while the second timer is active.

In some examples, the beam failure indication component 1130 may be configured as or otherwise support a means for receiving a control message indicating the beam failure detection for the primary sidelink carrier based on a quantity of beam failure instances satisfying a threshold, where initiating the first timer is based on the control message indicating the beam failure detection.

In some examples, the timer component 1140 may be configured as or otherwise support a means for detecting a beam failure of the primary sidelink carrier based on a beam failure timer at the first UE exceeding a threshold.

In some examples, to support transmitting the set of beam failure recovery reference signals, the beam failure recovery component 1145 may be configured as or otherwise support a means for transmitting the set of beam failure recovery reference signals via a subset of beam failure recovery reference signal resources from a set of beam failure recovery reference signal resources.

Additionally, or alternatively, the communications manager 1120 may support wireless communications at a second UE in accordance with examples as disclosed herein. The reference signal reception component 1150 may be configured as or otherwise support a means for receiving a first set of reference signals via a primary sidelink carrier of a sidelink carrier aggregation configuration and a second set of reference signals via one or more secondary sidelink carriers of the sidelink carrier aggregation configuration. In some examples, the beam failure indication component 1130 may be configured as or otherwise support a means for transmitting, based on the first set of reference signals and the second set of reference signals, a measurement message indicating measurements for a set of beams corresponding to a secondary sidelink carrier of the sidelink carrier aggregation configuration based on a beam failure instance for the primary sidelink carrier. In some examples, the primary carrier change indication component 1135 may be configured as or otherwise support a means for receiving, via Layer 1 signaling or Layer 2 signaling, a control message indicating to switch the primary sidelink carrier to the set of beams based on the measurements for the set of beams and the beam failure instance for the primary sidelink carrier.

In some examples, the sidelink communications component 1155 may be configured as or otherwise support a means for receiving sidelink control information via the set of beams based on switching the primary sidelink carrier to the set of beams.

In some examples, the control message is received prior to a beam failure detection procedure based on the beam failure instance.

In some examples, the beam failure recovery component 1145 may be configured as or otherwise support a means for initiating a beam failure detection procedure based on the beam failure instance, where the control message is received during the beam failure detection procedure.

In some examples, the beam failure recovery component 1145 may be configured as or otherwise support a means for initiating a beam failure recovery procedure based on a quantity of beam failure instances satisfying a threshold, where the control message is received during the beam failure recovery procedure.

In some examples, the beam failure indication component 1130 may be configured as or otherwise support a means for determining a quantity of beam failure instances satisfies a threshold, where transmitting the measurement message is based on the quantity of beam failure instances satisfying the threshold.

Additionally, or alternatively, the communications manager 1120 may support wireless communications at a second UE in accordance with examples as disclosed herein. In some examples, the reference signal reception component 1150 may be configured as or otherwise support a means for receiving a first set of reference signals via a primary sidelink carrier of a sidelink carrier aggregation configuration and a second set of reference signals via one or more secondary sidelink carriers of the sidelink carrier aggregation configuration. In some examples, the timer component 1140 may be configured as or otherwise support a means for initiating a first timer associated with beam failure recovery based on a beam failure detection for the primary sidelink carrier. In some examples, the beam failure recovery component 1145 may be configured as or otherwise support a means for monitoring for a set of beam failure recovery reference signals via one or more beams of the primary sidelink carrier while the first timer associated with beam failure recovery is active.

In some examples, the timer component 1140 may be configured as or otherwise support a means for initiating a second timer associated with beam failure recovery based on an expiration of the first timer. In some examples, the beam failure recovery component 1145 may be configured as or otherwise support a means for performing a random access procedure for the primary sidelink carrier while the second timer is active.

In some examples, the beam failure recovery component 1145 may be configured as or otherwise support a means for transmitting a control message indicating the beam failure detection for the primary sidelink carrier based on a quantity of beam failure instances satisfying a threshold, where initiating the first timer is based on the control message indicating the beam failure detection.

In some examples, to support transmitting the set of beam failure recovery reference signals, the beam failure recovery component 1145 may be configured as or otherwise support a means for monitoring for the set of beam failure recovery reference signals via a subset of beam failure recovery reference signal resources from a set of beam failure recovery reference signal resources.

Figure 12:
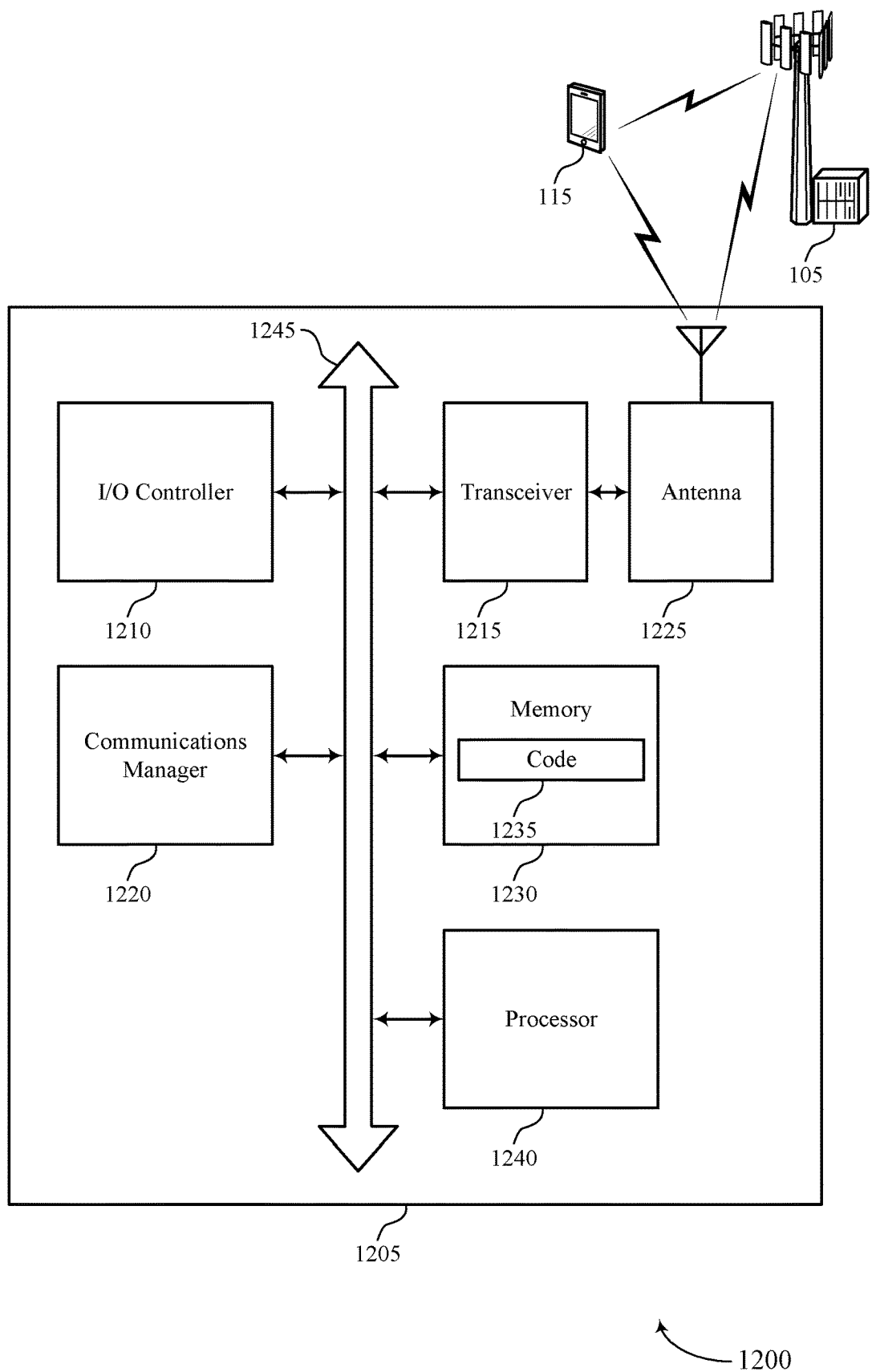
FIG. 12 illustrates a diagram of a system including a device that supports techniques for primary sidelink carrier updating in sidelink carrier aggregation in accordance with one or more aspects of the present disclosure.

FIG. 12 illustrates a diagram of a system 1200 including a device 1205 that supports techniques for primary sidelink carrier updating in sidelink carrier aggregation in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for primary sidelink carrier updating in sidelink carrier aggregation). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communications at a first UE in accordance with examples as disclosed herein. For example, the communications manager 1220 may be configured as or otherwise support a means for transmitting a first set of reference signals via a primary sidelink carrier of a sidelink carrier aggregation configuration and a second set of reference signals via one or more secondary sidelink carriers of the sidelink carrier aggregation configuration. The communications manager 1220 may be configured as or otherwise support a means for receiving, based on the first set of reference signals and the second set of reference signals, a measurement message indicating measurements for a set of beams corresponding to a secondary sidelink carrier of the sidelink carrier aggregation configuration based on a beam failure instance for the primary sidelink carrier. The communications manager 1220 may be configured as or otherwise support a means for transmitting, via Layer 1 signaling or Layer 2 signaling, a control message indicating to switch the primary sidelink carrier to the set of beams based on the measurements for the set of beams and the beam failure instance for the primary sidelink carrier.

Additionally, or alternatively, the communications manager 1220 may support wireless communications at a first UE in accordance with examples as disclosed herein. For example, the communications manager 1220 may be configured as or otherwise support a means for transmitting a first set of reference signals via a primary sidelink carrier of a sidelink carrier aggregation configuration and a second set of reference signals via one or more secondary sidelink carriers of the sidelink carrier aggregation configuration. The communications manager 1220 may be configured as or otherwise support a means for initiating a first timer associated with beam failure recovery based on a beam failure detection for the primary sidelink carrier. The communications manager 1220 may be configured as or otherwise support a means for transmitting a set of beam failure recovery reference signals via one or more beams of the primary sidelink carrier while the first timer associated with beam failure recovery is active.

Additionally, or alternatively, the communications manager 1220 may support wireless communications at a second UE in accordance with examples as disclosed herein. For example, the communications manager 1220 may be configured as or otherwise support a means for receiving a first set of reference signals via a primary sidelink carrier of a sidelink carrier aggregation configuration and a second set of reference signals via one or more secondary sidelink carriers of the sidelink carrier aggregation configuration. The communications manager 1220 may be configured as or otherwise support a means for transmitting, based on the first set of reference signals and the second set of reference signals, a measurement message indicating measurements for a set of beams corresponding to a secondary sidelink carrier of the sidelink carrier aggregation configuration based on a beam failure instance for the primary sidelink carrier. The communications manager 1220 may be configured as or otherwise support a means for receiving, via Layer 1 signaling or Layer 2 signaling, a control message indicating to switch the primary sidelink carrier to the set of beams based on the measurements for the set of beams and the beam failure instance for the primary sidelink carrier.

Additionally, or alternatively, the communications manager 1220 may support wireless communications at a second UE in accordance with examples as disclosed herein. For example, the communications manager 1220 may be configured as or otherwise support a means for receiving a first set of reference signals via a primary sidelink carrier of a sidelink carrier aggregation configuration and a second set of reference signals via one or more secondary sidelink carriers of the sidelink carrier aggregation configuration. The communications manager 1220 may be configured as or otherwise support a means for initiating a first timer associated with beam failure recovery based on a beam failure detection for the primary sidelink carrier. The communications manager 1220 may be configured as or otherwise support a means for monitoring for a set of beam failure recovery reference signals via one or more beams of the primary sidelink carrier while the first timer associated with beam failure recovery is active.

By including or configuring the communications manager 1220 in accordance with examples as described herein, the device 1205 may support techniques for improved communication reliability and reduced latency by preventing RLF for a primary sidelink carrier of a sidelink carrier aggregation configuration.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for primary sidelink carrier updating in sidelink carrier aggregation as described herein, or the processor 1240 and the memory 1230 may be otherwise configured to perform or support such operations.

Figure 13:
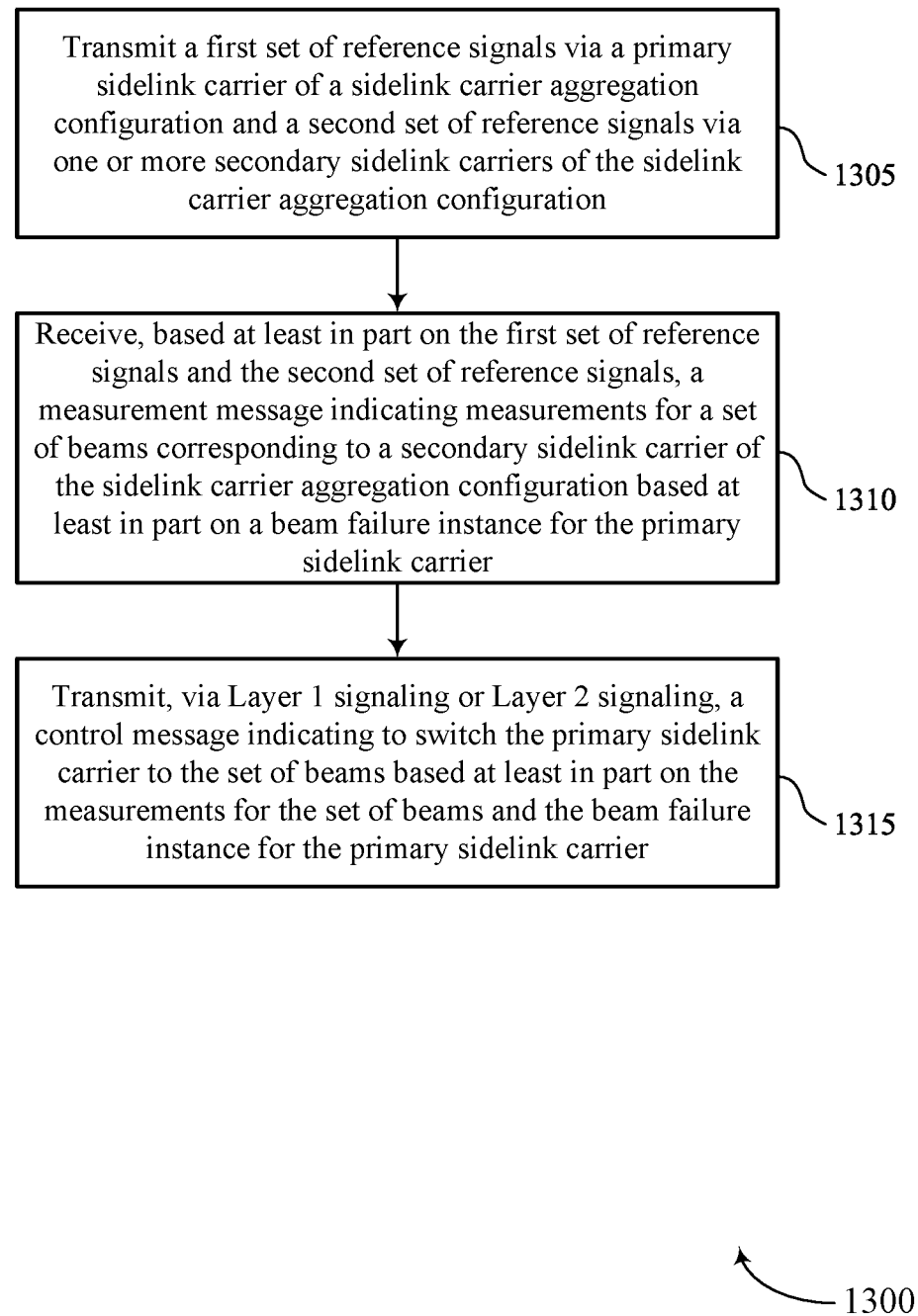
FIGS. 13 through 16 illustrate flowcharts showing methods that support techniques for primary sidelink carrier updating in sidelink carrier aggregation in accordance with one or more aspects of the present disclosure.

FIG. 13 illustrates a flowchart illustrating a method 1300 that supports techniques for primary sidelink carrier updating in sidelink carrier aggregation in accordance with one or more aspects of the present disclosure. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1305, the method may include transmitting a first set of reference signals via a primary sidelink carrier of a sidelink carrier aggregation configuration and a second set of reference signals via one or more secondary sidelink carriers of the sidelink carrier aggregation configuration. The operations of 1305 may be performed in accordance with examples as disclosed herein. In some examples, aspects of the operations of 1305 may be performed by a reference signal transmission component 1125 as described with reference to FIG. 11.

At 1310, the method may include receiving, based at least in part on the first set of reference signals and the second set of reference signals, a measurement message indicating measurements for a set of beams corresponding to a secondary sidelink carrier of the sidelink carrier aggregation configuration based at least in part on a beam failure instance for the primary sidelink carrier. The operations of 1310 may be performed in accordance with examples as disclosed herein. In some examples, aspects of the operations of 1310 may be performed by a beam failure indication component 1130 as described with reference to FIG. 11.

At 1315, the method may include transmitting, via Layer 1 signaling or Layer 2 signaling, a control message indicating to switch the primary sidelink carrier to the set of beams based at least in part on the measurements for the set of beams and the beam failure instance for the primary sidelink carrier. The operations of 1315 may be performed in accordance with examples as disclosed herein. In some examples, aspects of the operations of 1315 may be performed by a primary carrier change indication component 1135 as described with reference to FIG. 11.

Figure 14:
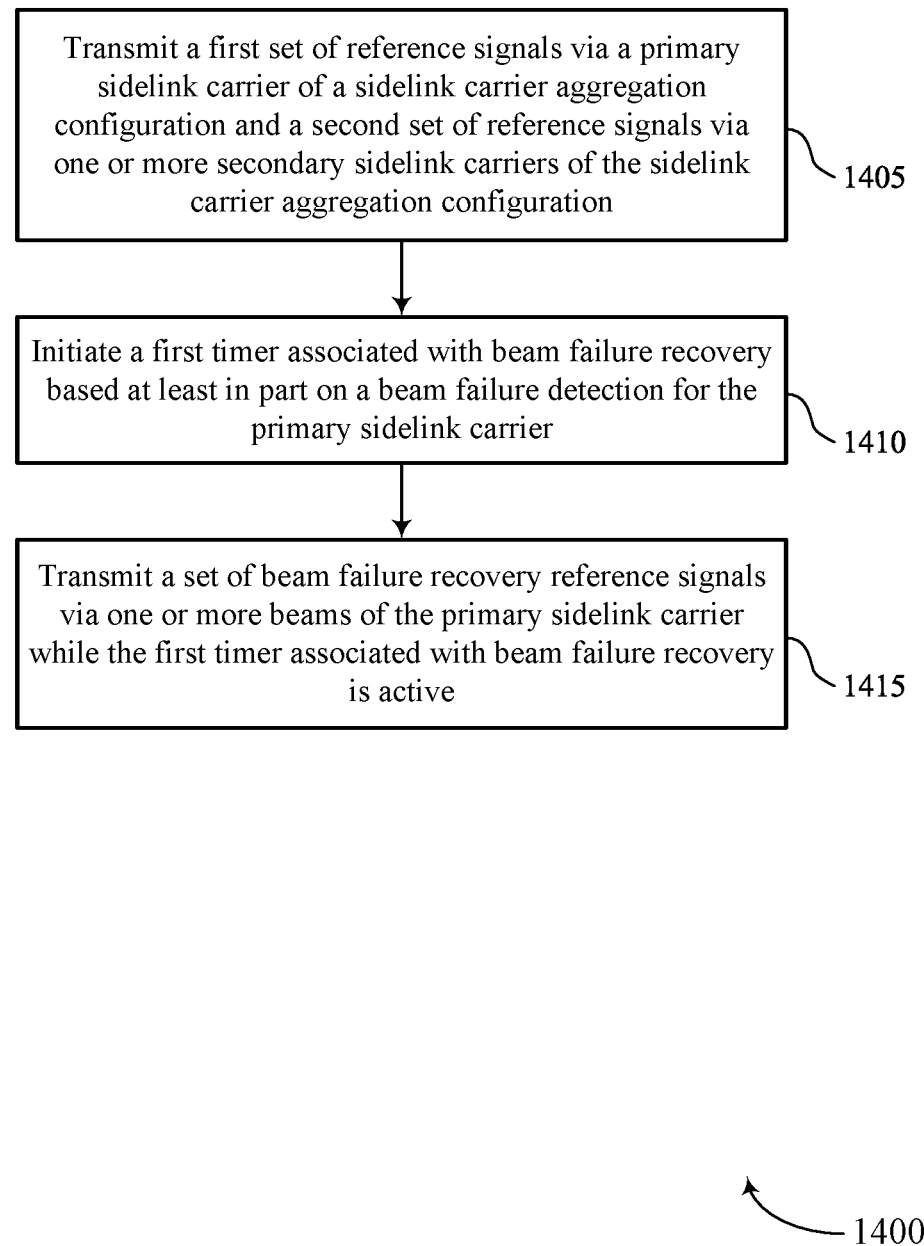

FIG. 14 illustrates a flowchart illustrating a method 1400 that supports techniques for primary sidelink carrier updating in sidelink carrier aggregation in accordance with one or more aspects of the present disclosure. The operations of the method 1400 may be implemented by a UE or its components as described herein. For example, the operations of the method 1400 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1405, the method may include transmitting a first set of reference signals via a primary sidelink carrier of a sidelink carrier aggregation configuration and a second set of reference signals via one or more secondary sidelink carriers of the sidelink carrier aggregation configuration. The operations of 1405 may be performed in accordance with examples as disclosed herein. In some examples, aspects of the operations of 1405 may be performed by a reference signal transmission component 1125 as described with reference to FIG. 11.

At 1410, the method may include initiating a first timer associated with beam failure recovery based at least in part on a beam failure detection for the primary sidelink carrier. The operations of 1410 may be performed in accordance with examples as disclosed herein. In some examples, aspects of the operations of 1410 may be performed by a timer component 1140 as described with reference to FIG. 11.

At 1415, the method may include transmitting a set of beam failure recovery reference signals via one or more beams of the primary sidelink carrier while the first timer associated with beam failure recovery is active. The operations of 1415 may be performed in accordance with examples as disclosed herein. In some examples, aspects of the operations of 1415 may be performed by a beam failure recovery component 1145 as described with reference to FIG. 11.

Figure 15:
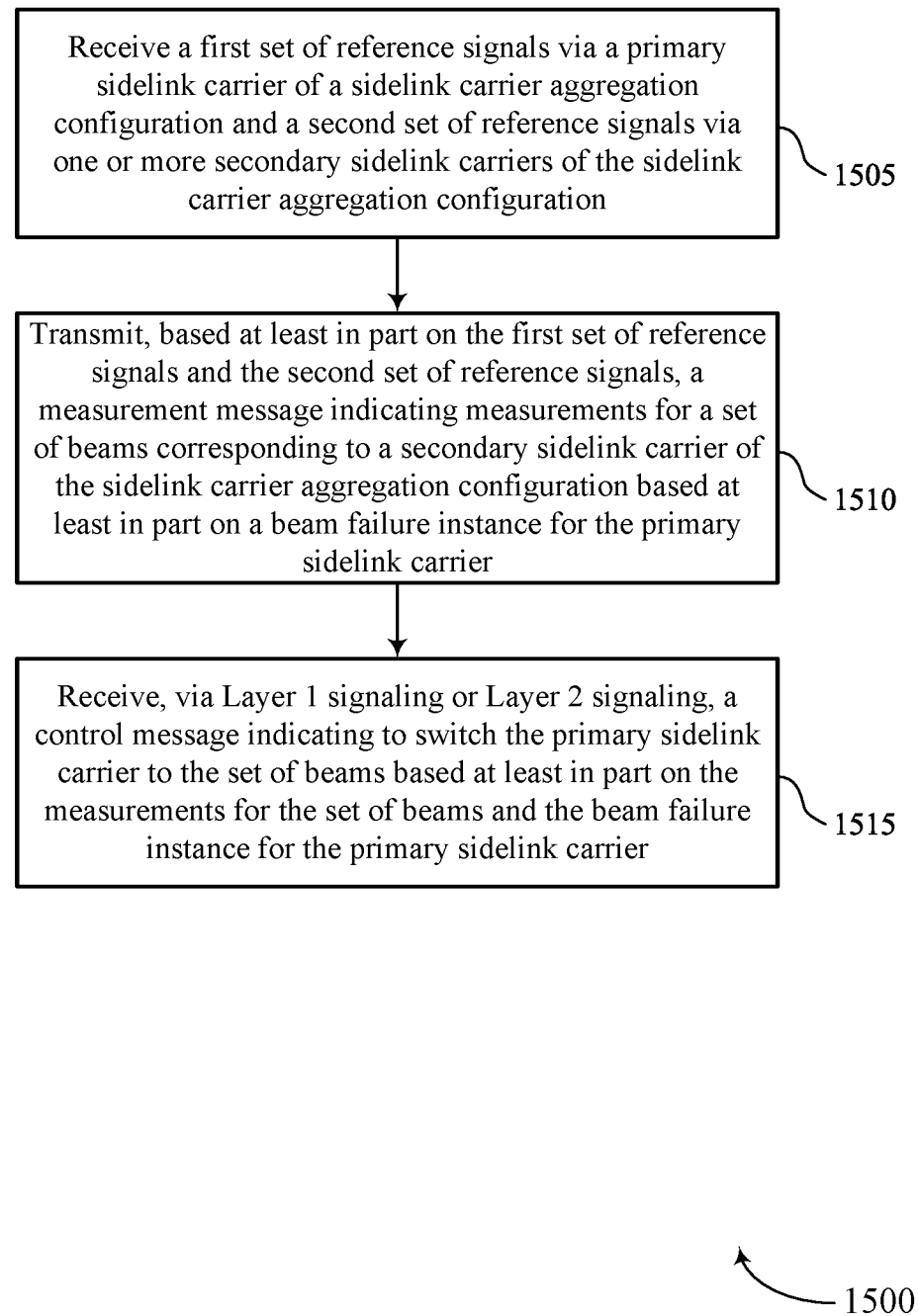

FIG. 15 illustrates a flowchart illustrating a method 1500 that supports techniques for primary sidelink carrier updating in sidelink carrier aggregation in accordance with one or more aspects of the present disclosure. The operations of the method 1500 may be implemented by a UE or its components as described herein. For example, the operations of the method 1500 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1505, the method may include receiving a first set of reference signals via a primary sidelink carrier of a sidelink carrier aggregation configuration and a second set of reference signals via one or more secondary sidelink carriers of the sidelink carrier aggregation configuration. The operations of 1505 may be performed in accordance with examples as disclosed herein. In some examples, aspects of the operations of 1505 may be performed by a reference signal reception component 1150 as described with reference to FIG. 11.

At 1510, the method may include transmitting, based at least in part on the first set of reference signals and the second set of reference signals, a measurement message indicating measurements for a set of beams corresponding to a secondary sidelink carrier of the sidelink carrier aggregation configuration based at least in part on a beam failure instance for the primary sidelink carrier. The operations of 1510 may be performed in accordance with examples as disclosed herein. In some examples, aspects of the operations of 1510 may be performed by a beam failure indication component 1130 as described with reference to FIG. 11.

At 1515, the method may include receiving, via Layer 1 signaling or Layer 2 signaling, a control message indicating to switch the primary sidelink carrier to the set of beams based at least in part on the measurements for the set of beams and the beam failure instance for the primary sidelink carrier. The operations of 1515 may be performed in accordance with examples as disclosed herein. In some examples, aspects of the operations of 1515 may be performed by a primary carrier change indication component 1135 as described with reference to FIG. 11.

Figure 16:
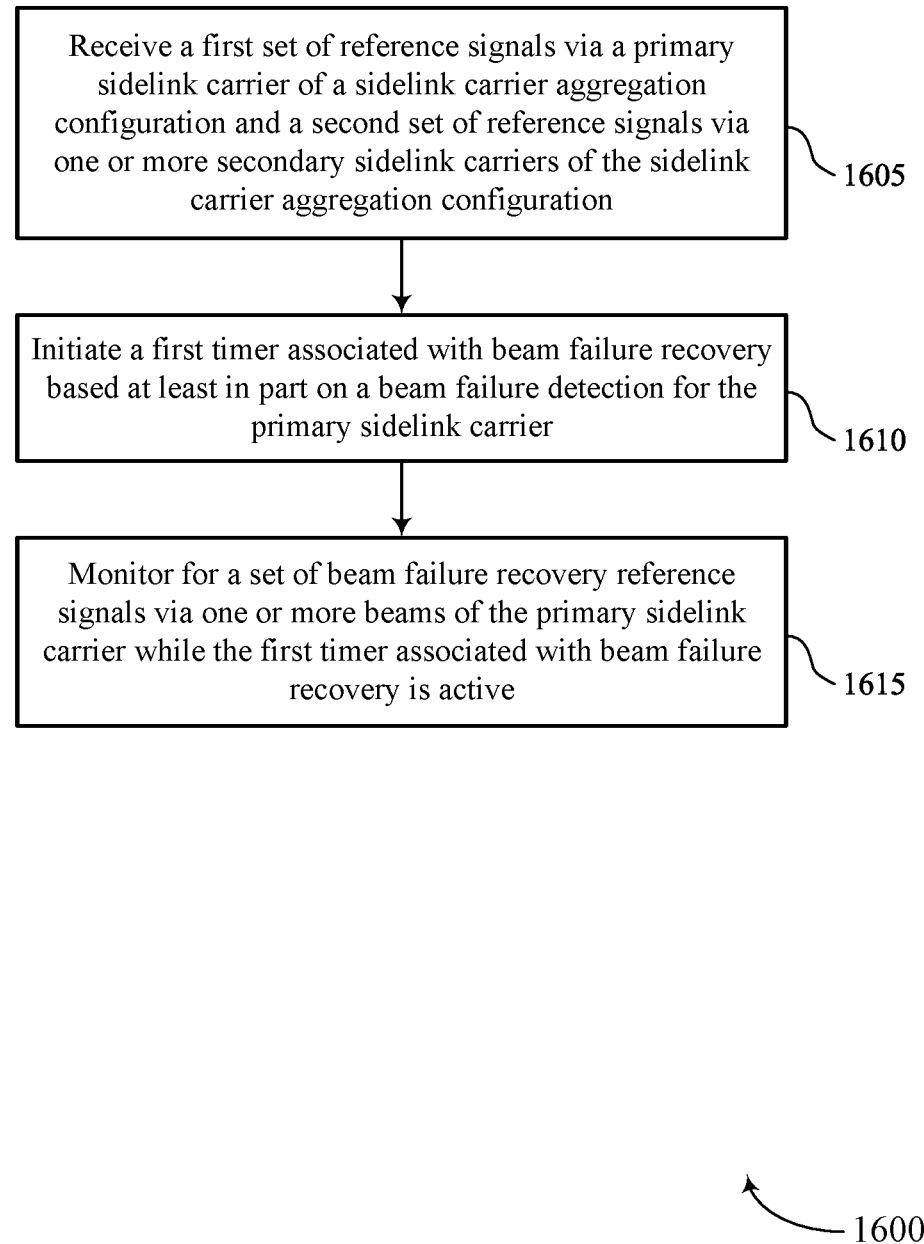

FIG. 16 illustrates a flowchart illustrating a method 1600 that supports techniques for primary sidelink carrier updating in sidelink carrier aggregation in accordance with one or more aspects of the present disclosure. The operations of the method 1600 may be implemented by a UE or its components as described herein. For example, the operations of the method 1600 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1605, the method may include receiving a first set of reference signals via a primary sidelink carrier of a sidelink carrier aggregation configuration and a second set of reference signals via one or more secondary sidelink carriers of the sidelink carrier aggregation configuration. The operations of 1605 may be performed in accordance with examples as disclosed herein. In some examples, aspects of the operations of 1605 may be performed by a reference signal reception component 1150 as described with reference to FIG. 11.

At 1610, the method may include initiating a first timer associated with beam failure recovery based at least in part on a beam failure detection for the primary sidelink carrier. The operations of 1610 may be performed in accordance with examples as disclosed herein. In some examples, aspects of the operations of 1610 may be performed by a timer component 1140 as described with reference to FIG. 11.

At 1615, the method may include monitoring for a set of beam failure recovery reference signals via one or more beams of the primary sidelink carrier while the first timer associated with beam failure recovery is active. The operations of 1615 may be performed in accordance with examples as disclosed herein. In some examples, aspects of the operations of 1615 may be performed by a beam failure recovery component 1145 as described with reference to FIG. 11.

The following provides an overview of aspects of the present disclosure:

Aspect 1: A method for wireless communications at a first UE, comprising: transmitting a first set of reference signals via a primary sidelink carrier of a sidelink carrier aggregation configuration and a second set of reference signals via one or more secondary sidelink carriers of the sidelink carrier aggregation configuration; receiving, based at least in part on the first set of reference signals and the second set of reference signals, a measurement message indicating measurements for a set of beams corresponding to a secondary sidelink carrier of the sidelink carrier aggregation configuration based at least in part on a beam failure instance for the primary sidelink carrier; and transmitting, via Layer 1 signaling or Layer 2 signaling, a control message indicating to switch the primary sidelink carrier to the set of beams based at least in part on the measurements for the set of beams and the beam failure instance for the primary sidelink carrier.

Aspect 2: The method of aspect 1, further comprising: transmitting sidelink control information via the set of beams based at least in part on switching the primary sidelink carrier to the set of beams.

Aspect 3: The method of any of aspects 1 through 2, further comprising: switching the primary sidelink carrier to the set of beams corresponding to the secondary sidelink carrier based at least in part on the set of beams corresponding to the secondary sidelink carrier sustaining a radio resource control link of the primary sidelink carrier.

Aspect 4: The method of any of aspects 1 through 3, further comprising: determining the measurements for the set of beams corresponding to the secondary sidelink carrier satisfy a threshold associated with sustaining a radio resource control link of the primary sidelink carrier, wherein transmitting the control message is based at least in part on the measurements for the set of beams satisfying the threshold.

Aspect 5: The method of any of aspects 1 through 4, wherein the control message is transmitted based at least in part on the measurements for the set of beams corresponding to the secondary sidelink carrier being higher than measurements for a second set of beams corresponding to the primary sidelink carrier.

Aspect 6: The method of any of aspects 1 through 5, wherein the control message is transmitted prior to a beam failure detection procedure based at least in part on the beam failure instance.

Aspect 7: The method of any of aspects 1 through 5, further comprising: initiating a beam failure detection procedure based at least in part on the beam failure instance, wherein the control message is transmitted during the beam failure detection procedure.

Aspect 8: The method of any of aspects 1 through 5, further comprising: initiating a beam failure recovery procedure based at least in part on a quantity of beam failure instances satisfying a threshold, wherein the control message is transmitted during the beam failure recovery procedure.

Aspect 9: The method of any of aspects 1 through 8, wherein the measurement message is received based at least in part on a quantity of beam failure instances satisfying a threshold.

Aspect 10: The method of any of aspects 1 through 9, further comprising: receiving a second control message indicating a beam failure detection; and initiating a first beam failure recovery timer based at least in part on the beam failure detection.

Aspect 11: The method of aspect 10, further comprising: detecting an expiration of the first beam failure recovery timer, wherein transmitting the control message is based at least in part on the expiration of the first beam failure recovery timer.

Aspect 12: The method of any of aspects 10 through 11, wherein the first beam failure recovery timer is associated with beam reselection.

Aspect 13: The method of any of aspects 10 through 12, further comprising: detecting an expiration of the first beam failure recovery timer; and initiating a second beam failure recovery timer associated with performing a random access procedure for the primary sidelink carrier.

Aspect 14: The method of any of aspects 1 through 13, wherein the primary sidelink carrier corresponds to a first frequency range, and the secondary sidelink carrier corresponds to a second frequency range.

Aspect 15: The method of any of aspects 1 through 14, wherein the primary sidelink carrier corresponds to a first radio frequency spectrum band in a radio frequency range and the secondary sidelink carrier corresponds to a second radio frequency spectrum band in the radio frequency range.

Aspect 16: The method of any of aspects 1 through 15, wherein the primary sidelink carrier and the secondary sidelink carrier correspond to a same radio frequency spectrum band.

Aspect 17: A method for wireless communications at a first UE, comprising: transmitting a first set of reference signals via a primary sidelink carrier of a sidelink carrier aggregation configuration and a second set of reference signals via one or more secondary sidelink carriers of the sidelink carrier aggregation configuration; initiating a first timer associated with beam failure recovery based at least in part on a beam failure detection for the primary sidelink carrier; and transmitting a set of beam failure recovery reference signals via one or more beams of the primary sidelink carrier while the first timer associated with beam failure recovery is active.

Aspect 18: The method of aspect 17, further comprising: initiating a second timer associated with beam failure recovery based at least in part on an expiration of the first timer; and performing a random access procedure for the primary sidelink carrier while the second timer is active.

Aspect 19: The method of any of aspects 17 through 18, further comprising: receiving a control message indicating the beam failure detection for the primary sidelink carrier based at least in part on a quantity of beam failure instances satisfying a threshold, wherein initiating the first timer is based at least in part on the control message indicating the beam failure detection.

Aspect 20: The method of any of aspects 17 through 19, further comprising: detecting a beam failure of the primary sidelink carrier based at least in part on a beam failure timer at the first UE exceeding a threshold.

Aspect 21: The method of any of aspects 17 through 20, wherein transmitting the set of beam failure recovery reference signals comprises: transmitting the set of beam failure recovery reference signals via a subset of beam failure recovery reference signal resources from a set of beam failure recovery reference signal resources.

Aspect 22: A method for wireless communications at a second UE, comprising: receiving a first set of reference signals via a primary sidelink carrier of a sidelink carrier aggregation configuration and a second set of reference signals via one or more secondary sidelink carriers of the sidelink carrier aggregation configuration; transmitting, based at least in part on the first set of reference signals and the second set of reference signals, a measurement message indicating measurements for a set of beams corresponding to a secondary sidelink carrier of the sidelink carrier aggregation configuration based at least in part on a beam failure instance for the primary sidelink carrier; and receiving, via Layer 1 signaling or Layer 2 signaling, a control message indicating to switch the primary sidelink carrier to the set of beams based at least in part on the measurements for the set of beams and the beam failure instance for the primary sidelink carrier.

Aspect 23: The method of aspect 22, further comprising: receiving sidelink control information via the set of beams based at least in part on switching the primary sidelink carrier to the set of beams.

Aspect 24: The method of any of aspects 22 through 23, wherein the control message is received prior to a beam failure detection procedure based at least in part on the beam failure instance.

Aspect 25: The method of any of aspects 22 through 24, further comprising: initiating a beam failure detection procedure based at least in part on the beam failure instance, wherein the control message is received during the beam failure detection procedure.

Aspect 26: The method of any of aspects 22 through 27, further comprising: initiating a beam failure recovery procedure based at least in part on a quantity of beam failure instances satisfying a threshold, wherein the control message is received during the beam failure recovery procedure.

Aspect 28: The method of any of aspects 22 through 26, further comprising: determining a quantity of beam failure instances satisfies a threshold, wherein transmitting the measurement message is based at least in part on the quantity of beam failure instances satisfying the threshold.

Aspect 29: A method for wireless communications at a second UE, comprising: receiving a first set of reference signals via a primary sidelink carrier of a sidelink carrier aggregation configuration and a second set of reference signals via one or more secondary sidelink carriers of the sidelink carrier aggregation configuration; initiating a first timer associated with beam failure recovery based at least in part on a beam failure detection for the primary sidelink carrier; and monitoring for a set of beam failure recovery reference signals via one or more beams of the primary sidelink carrier while the first timer associated with beam failure recovery is active.

Aspect 30: The method of aspect 29, further comprising: initiating a second timer associated with beam failure recovery based at least in part on an expiration of the first timer; and performing a random access procedure for the primary sidelink carrier while the second timer is active.

Aspect 31: The method of any of aspects 29 through 30, further comprising: transmitting a control message indicating the beam failure detection for the primary sidelink carrier based at least in part on a quantity of beam failure instances satisfying a threshold, wherein initiating the first timer is based at least in part on the control message indicating the beam failure detection.

Aspect 32: The method of any of aspects 29 through 31, wherein transmitting the set of beam failure recovery reference signals comprises: monitoring for the set of beam failure recovery reference signals via a subset of beam failure recovery reference signal resources from a set of beam failure recovery reference signal resources.

Aspect 33: An apparatus for wireless communications at a first UE, comprising a processor; and a memory, coupled with the processor, the memory storing instructions executable by the processor to cause the apparatus to perform a method of any of aspects 1 through 16.

Aspect 34: An apparatus for wireless communications at a first UE, comprising at least one means for performing a method of any of aspects 1 through 16.

Aspect 35: A non-transitory computer-readable medium storing code for wireless communications at a first UE, the code comprising instructions executable by a processor to perform a method of any of aspects 1 through 16.

Aspect 36: An apparatus for wireless communications at a first UE, comprising a processor; and a memory, coupled with the processor, the memory storing instructions executable by the processor to cause the apparatus to perform a method of any of aspects 17 through 21.

Aspect 37: An apparatus for wireless communications at a first UE, comprising at least one means for performing a method of any of aspects 17 through 21.

Aspect 38: A non-transitory computer-readable medium storing code for wireless communications at a first UE, the code comprising instructions executable by a processor to perform a method of any of aspects 17 through 21.

Aspect 39: An apparatus for wireless communications at a second UE, comprising a processor; and a memory, coupled with the processor, the memory storing instructions executable by the processor to cause the apparatus to perform a method of any of aspects 22 through 28.

Aspect 40: An apparatus for wireless communications at a second UE, comprising at least one means for performing a method of any of aspects 22 through 28.

Aspect 41: A non-transitory computer-readable medium storing code for wireless communications at a second UE, the code comprising instructions executable by a processor to perform a method of any of aspects 22 through 28.

Aspect 42: An apparatus for wireless communications at a second UE, comprising a processor; and a memory, coupled with the processor, the memory storing instructions executable by the processor to cause the apparatus to cause the apparatus to perform a method of any of aspects 29 through 32.

Aspect 43: An apparatus for wireless communications at a second UE, comprising at least one means for performing a method of any of aspects 29 through 32.

Aspect 44: A non-transitory computer-readable medium storing code for wireless communications at a second UE, the code comprising instructions executable by a processor to perform a method of any of aspects 29 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:
   a processor; and
   a memory, coupled with the processor, the memory storing instructions executable by the processor to cause the apparatus to:
      transmit a first set of reference signals via a primary sidelink carrier of a sidelink carrier aggregation configuration and a second set of reference signals via one or more secondary sidelink carriers of the sidelink carrier aggregation configuration;
      receive, based at least in part on the first set of reference signals and the second set of reference signals, a measurement message indicating measurements for a set of beams corresponding to a secondary sidelink carrier of the sidelink carrier aggregation configuration based at least in part on a beam failure instance for the primary sidelink carrier; and
      transmit, via Layer 1 signaling or Layer 2 signaling, a control message indicating to switch the primary sidelink carrier to the set of beams based at least in part on the measurements for the set of beams and the beam failure instance for the primary sidelink carrier.

2. The apparatus of claim 1, wherein the instructions are further executable by the processor to cause the apparatus to:
   transmit sidelink control information via the set of beams based at least in part on switching the primary sidelink carrier to the set of beams.

3. The apparatus of claim 1, wherein the instructions are further executable by the processor to cause the apparatus to:
   switch the primary sidelink carrier to the set of beams corresponding to the secondary sidelink carrier based at least in part on the set of beams corresponding to the secondary sidelink carrier sustaining a radio resource control link of the primary sidelink carrier.

4. The apparatus of claim 1, wherein the instructions are further executable by the processor to cause the apparatus to:
   determine the measurements for the set of beams corresponding to the secondary sidelink carrier satisfy a threshold associated with sustaining a radio resource control link of the primary sidelink carrier, wherein transmitting the control message is based at least in part on the measurements for the set of beams satisfying the threshold.

5. The apparatus of claim 1, wherein the control message is transmitted based at least in part on the measurements for the set of beams corresponding to the secondary sidelink carrier being higher than measurements for a second set of beams corresponding to the primary sidelink carrier.

6. The apparatus of claim 1, wherein the control message is transmitted prior to a beam failure detection procedure based at least in part on the beam failure instance.

7. The apparatus of claim 1, wherein the instructions are further executable by the processor to cause the apparatus to:
   initiate a beam failure detection procedure based at least in part on the beam failure instance, wherein the control message is transmitted during the beam failure detection procedure.

8. The apparatus of claim 1, wherein the instructions are further executable by the processor to cause the apparatus to:
   initiate a beam failure recovery procedure based at least in part on a quantity of beam failure instances satisfying a threshold, wherein the control message is transmitted during the beam failure recovery procedure.

9. The apparatus of claim 1, wherein the measurement message is received based at least in part on a quantity of beam failure instances satisfying a threshold.

10. The apparatus of claim 1, wherein the instructions are further executable by the processor to cause the apparatus to:
receive a second control message indicating a beam failure detection; and
initiate a first beam failure recovery timer based at least in part on the beam failure detection.

11. The apparatus of claim 10, wherein the instructions are further executable by the processor to cause the apparatus to:
detect an expiration of the first beam failure recovery timer, wherein transmitting the control message is based at least in part on the expiration of the first beam failure recovery timer.

12. The apparatus of claim 10, wherein:
the first beam failure recovery timer is associated with beam reselection.

13. The apparatus of claim 10, wherein the instructions are further executable by the processor to cause the apparatus to:
detect an expiration of the first beam failure recovery timer; and
initiate a second beam failure recovery timer associated with performing a random access procedure for the primary sidelink carrier.

14. The apparatus of claim 1, wherein the primary sidelink carrier corresponds to a first frequency range, and the secondary sidelink carrier corresponds to a second frequency range.

15. The apparatus of claim 1, wherein the primary sidelink carrier corresponds to a first radio frequency spectrum band in a radio frequency range and the secondary sidelink carrier corresponds to a second radio frequency spectrum band in the radio frequency range.

16. The apparatus of claim 1, wherein the primary sidelink carrier and the secondary sidelink carrier correspond to a same radio frequency spectrum band.

17. An apparatus for wireless communications at a second user equipment (UE), comprising:
a processor; and
a memory, coupled with the processor, the memory storing instructions executable by the processor to cause the apparatus to:
receive a first set of reference signals via a primary sidelink carrier of a sidelink carrier aggregation configuration and a second set of reference signals via one or more secondary sidelink carriers of the sidelink carrier aggregation configuration;
transmit, based at least in part on the first set of reference signals and the second set of reference signals, a measurement message indicating measurements for a set of beams corresponding to a secondary sidelink carrier of the sidelink carrier aggregation configuration based at least in part on a beam failure instance for the primary sidelink carrier; and
receive, via Layer 1 signaling or Layer 2 signaling, a control message indicating to switch the primary sidelink carrier to the set of beams based at least in part on the measurements for the set of beams and the beam failure instance for the primary sidelink carrier.

18. The apparatus of claim 17, wherein the instructions are further executable by the processor to cause the apparatus to:
receive sidelink control information via the set of beams based at least in part on switching the primary sidelink carrier to the set of beams.

19. The apparatus of claim 17, wherein the instructions are further executable by the processor to cause the apparatus to:
initiate a beam failure detection procedure based at least in part on the beam failure instance, wherein the control message is received during the beam failure detection procedure.

20. The apparatus of claim 17, wherein the instructions are further executable by the processor to cause the apparatus to:
initiate a beam failure recovery procedure based at least in part on a quantity of beam failure instances satisfying a threshold, wherein the control message is received during the beam failure recovery procedure.

21. The apparatus of claim 17, wherein the instructions are further executable by the processor to cause the apparatus to:
determine a quantity of beam failure instances satisfies a threshold, wherein transmitting the measurement message is based at least in part on the quantity of beam failure instances satisfying the threshold.

* * * * *